(12) United States Patent
Anderson et al.

(10) Patent No.: US 7,363,935 B2
(45) Date of Patent: Apr. 29, 2008

(54) FIELD CONFIGURABLE SHUT-OFF VALVE

(75) Inventors: Gaylen Anderson, Waterdown (CA);
Patrice B. Bansa, Mississauga (CA);
Antonio Zenga, Mississauga (CA);
Charles S. Charron, Oakville (CA);
Trygve Husebye, Mississauga (CA)

(73) Assignee: Dahl Brothers Canada Limited, Mississauga (CA)

( * ) Notice: Subject to any disclaimer, the term of this patent is extended or adjusted under 35 U.S.C. 154(b) by 132 days.

(21) Appl. No.: 11/185,774

(22) Filed: Jul. 21, 2005

(65) Prior Publication Data
US 2005/0252560 A1 Nov. 17, 2005

Related U.S. Application Data

(60) Division of application No. 10/339,669, filed on Jan. 10, 2003, now Pat. No. 6,932,104, which is a continuation-in-part of application No. 10/135,850, filed on May 1, 2002, now Pat. No. 6,874,824.

(51) Int. Cl.
*F16K 5/06* (2006.01)
(52) U.S. Cl. ............................. 137/271; 251/315.14
(58) Field of Classification Search ............... 137/269, 137/271; 251/315.1, 315.13, 315.14
See application file for complete search history.

(56) References Cited

U.S. PATENT DOCUMENTS

| | | | |
|---|---|---|---|
| 2,050,137 A | 8/1936 | Walsh | |
| 2,628,060 A | * 2/1953 | Parker | ...................... 251/174 |
| 3,438,387 A | 4/1969 | Scaramucci | |
| 3,467,413 A | 9/1969 | Madrelle | |
| 3,943,962 A | 3/1976 | Nagy | |
| 4,057,883 A | 11/1977 | Paptzun et al. | |
| 4,068,822 A | 1/1978 | Richards | |
| 4,118,009 A | 10/1978 | Chmura | |
| 4,458,925 A | 7/1984 | Raulins et al. | |
| 4,476,891 A | 10/1984 | Mulas et al. | |
| 4,572,239 A | 2/1986 | Koch et al. | |
| 4,580,763 A | 4/1986 | Velan | |
| 4,779,840 A | 10/1988 | Andrea | |
| 5,735,307 A | 4/1998 | Charron | |
| 5,857,622 A | 1/1999 | Holt | |
| 5,992,823 A | 11/1999 | Hung-Lin | |
| 6,206,028 B1 | 3/2001 | Holden et al. | |

FOREIGN PATENT DOCUMENTS

EP 0 607 770 A 7/1994

\* cited by examiner

*Primary Examiner*—John Fox
(74) *Attorney, Agent, or Firm*—Bereskin & Parr

(57) ABSTRACT

A kit of parts for configuring and assembling a shut-off valve in the field has a valve body, a plurality of connection fittings, and a plurality of gaskets. The connection fittings each have a first end with a common configuration adapted to fit into any of three ports provided in the valve body. The connection fittings have second ends with different configurations adapted to connect with any of a variety of conduit configurations which may be encountered in the field.

13 Claims, 19 Drawing Sheets

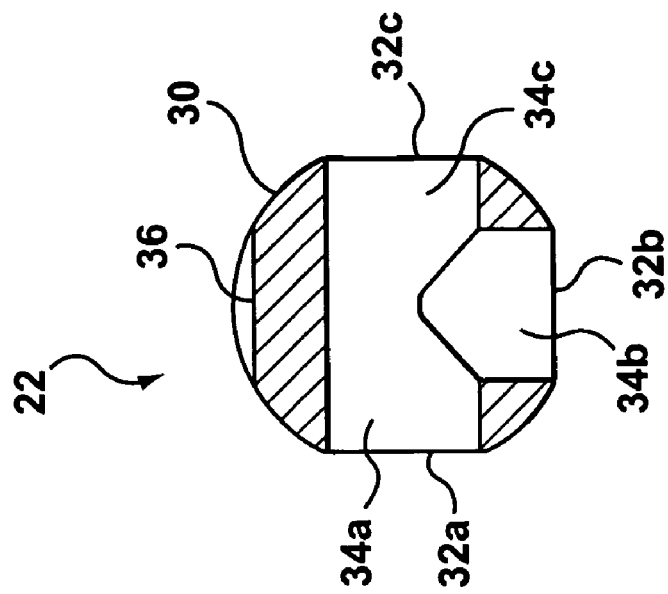
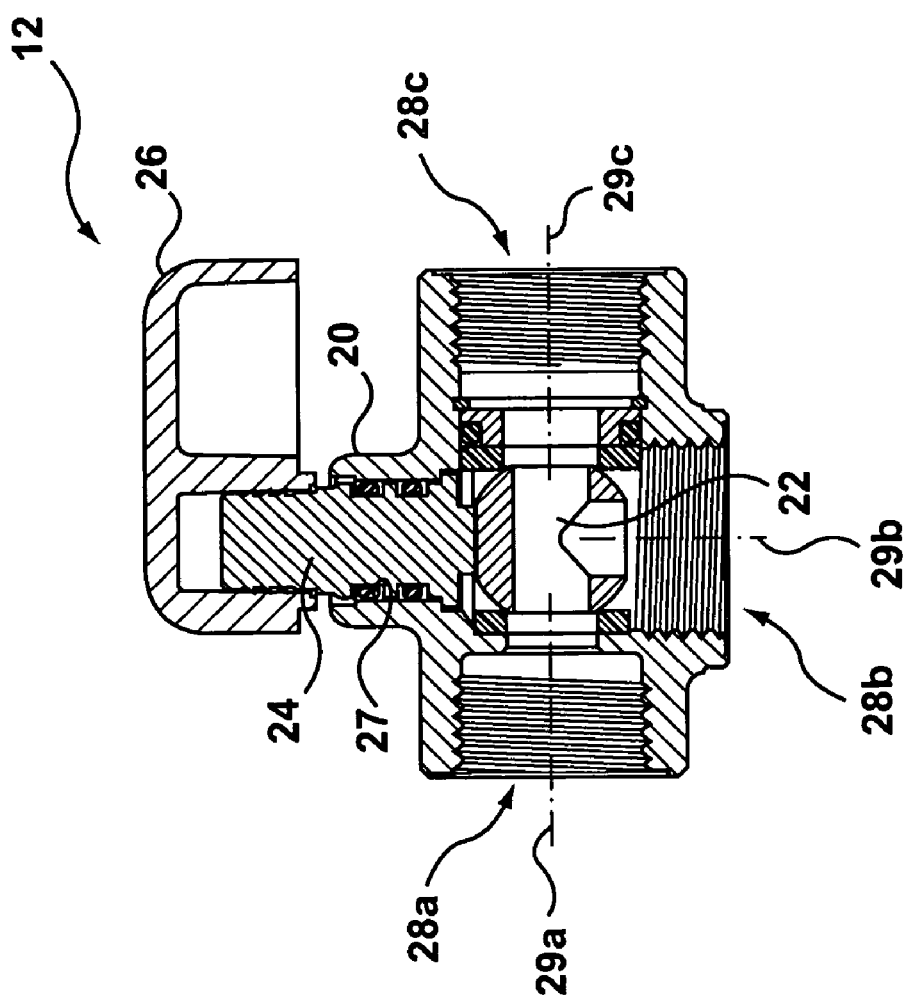
FIG. 3
FIG. 2

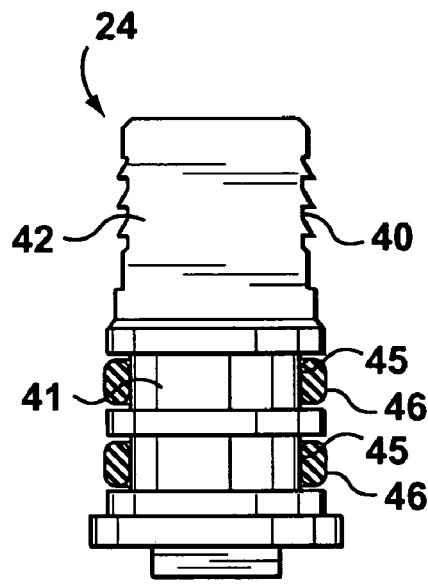
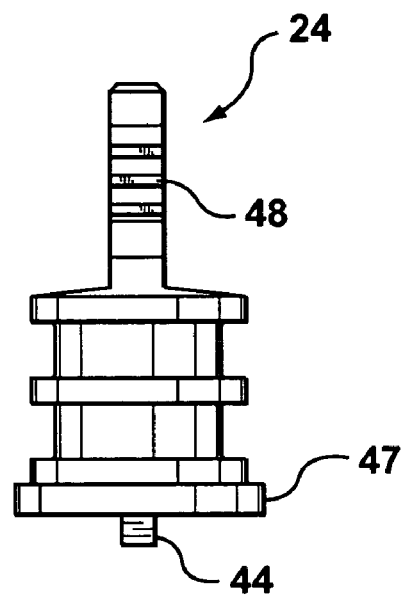
FIG. 4      FIG. 5
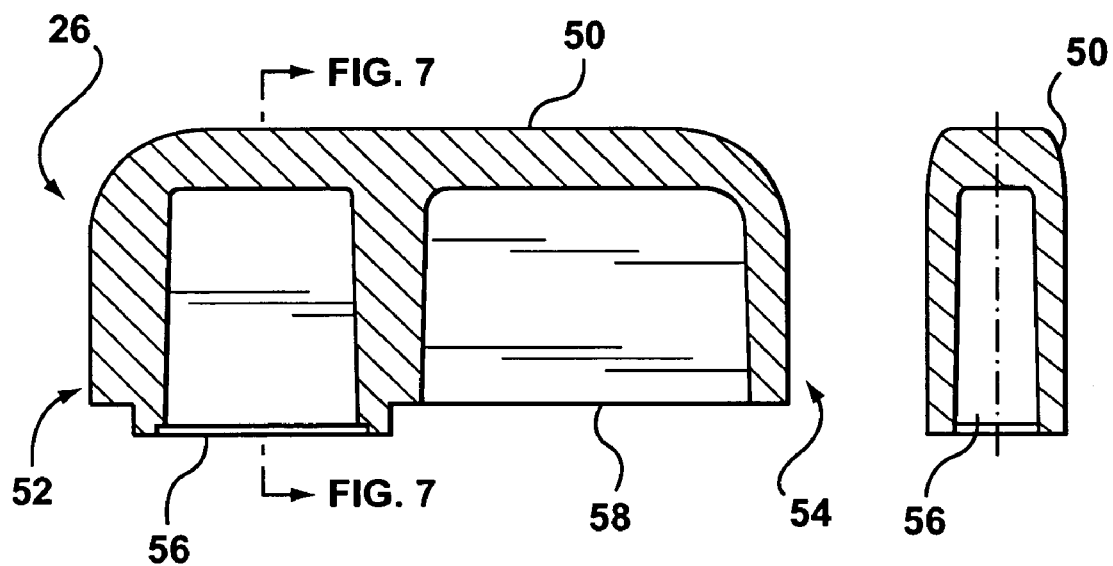
FIG. 6      FIG. 7

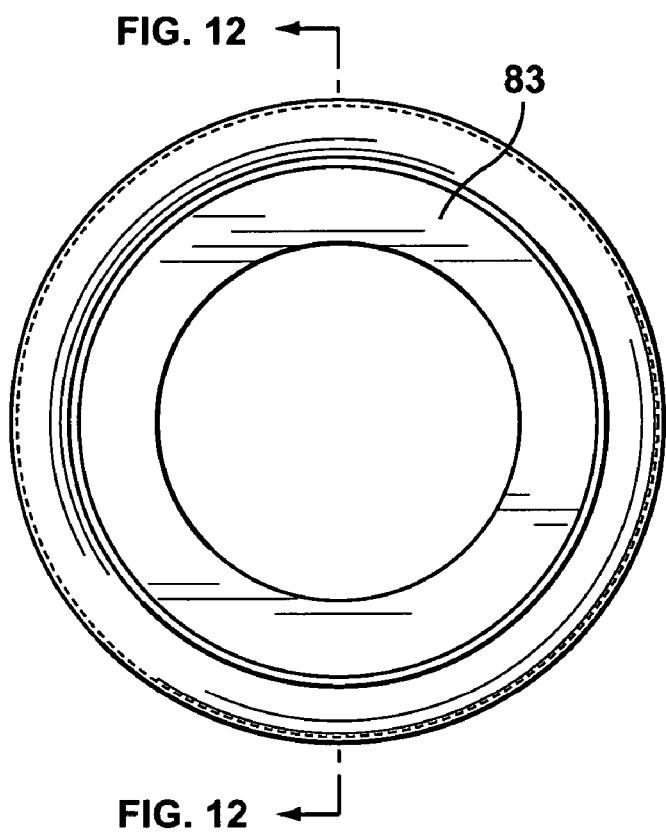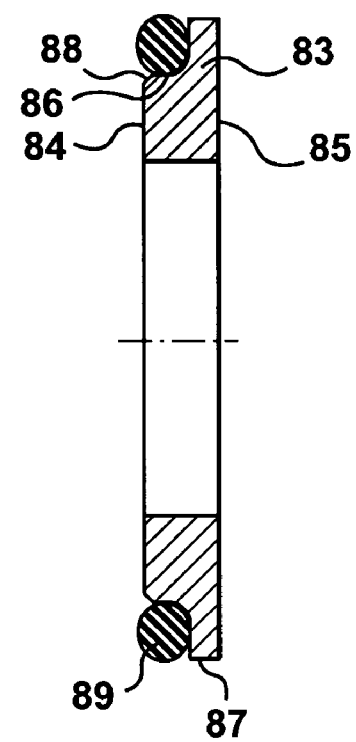
FIG. 11
FIG. 12

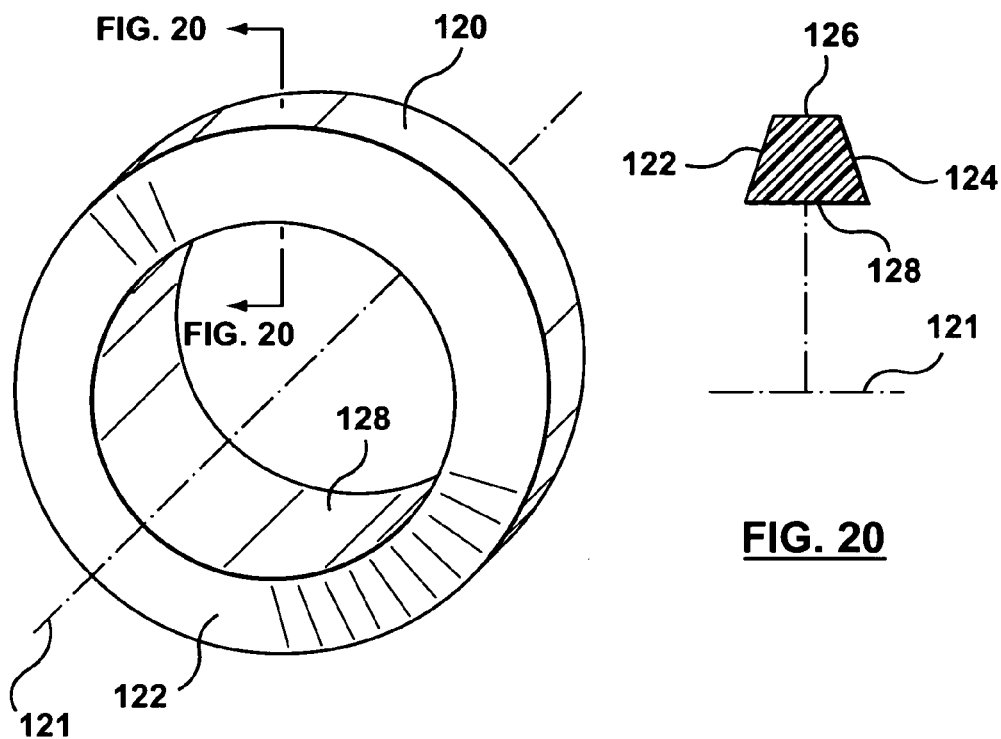
FIG. 20
FIG. 19
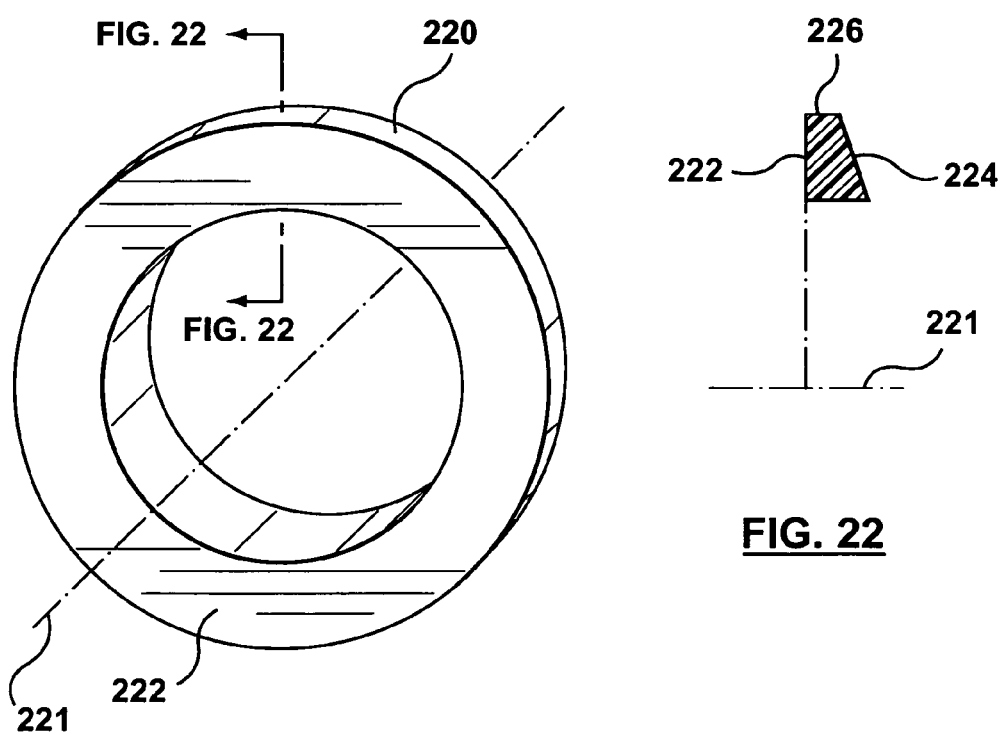
FIG. 22
FIG. 21

FIELD CONFIGURABLE SHUT-OFF VALVE

This application is a division of U.S. application Ser. No. 10/339,669 filed Jan. 10, 2003, which is a continuation-in-part of U.S. application Ser. No. 10/135,850 filed May 1, 2002, and issued as U.S. Pat. No. 6,874,824. All of the applications mentioned above are incorporated into this document in their entirety by this reference to them.

FIELD OF THE INVENTION

The present invention relates to valves used in fluid conduit configurations to alternately shut off or allow fluid flow.

BACKGROUND OF THE INVENTION

Providing fluid flow through a conduit is a common requirement. In industrial applications, the flow of air, water or other fluids is often required in the operation of equipment. In residential settings, household plumbing is probably the most common example of fluid flow in a conduit. In these applications, it is often desirable to have the ability to control the flow of fluid at one or more points, through the use of shut-off valves. Such valves can be used simply as an outlet for the fluid, or to isolate downstream elements for such purposes as repair or maintenance.

The conduits to which a valve is to be connected will have a particular configuration defined by the conduit material, size, type of end connections, and arrangement.

Typical conduit materials include copper, plastic, rubber, steel, and composites.

The size of the conduit is generally specified by the inner diameter, but the outer diameter may also be important in certain connection types.

There are a wide variety of end connection types, including socket ends for soldering, male and female thread connections, compression fittings, barb fittings, flare connections, and many others.

The arrangement of the conduit refers to the number and orientation of the conduits to which the valve is to be connected. The arrangement may include a single conduit, at the end of which the valve is to be installed. Alternatively, the arrangement may include two coaxial conduits, requiring a straight valve, or two perpendicular conduits, requiring an angle valve. The arrangement could also consist of three conduits for which a "T" valve is required.

It is readily apparent that the number of unique conduit configurations is considerable. Stocking a comprehensive inventory of valves is therefore a difficult and costly task. For plumbers or pipefitters, it is generally cost prohibitive to carry a large inventory. Plumbers may have sources from which specific valves can be ordered, but receiving the valve is of course delayed by processing and delivery time. Alternatively, plumbers may have access to wholesale suppliers but such suppliers are not usually open in evenings or on weekends. As a result this may cause considerable delay and inconvenience.

The do-it-yourself homeowner will generally not stock any parts. Rather, he or she will typically rely on local hardware or home improvement retailers. These stores are usually open in evenings and on weekends, which is particularly convenient for the do-it-yourself homeowner. However, these retailers are also reluctant to incur the high cost of inventory associated with stocking ready-to-use valves in numerous variety, or to give up the large amount of shelf space which such a variety of valves would require.

It would be advantageous to have a kit of parts from which a valve could be assembled. Such a kit for assembling a valve is disclosed in U.S. Pat. No. 5,735,307 to Charron. The kit includes a valve body and end connectors which fit between the valve body and the conduits to which the valve is to be connected.

However, the valve assembled according to the '307 patent is assembled in a production environment by the manufacturer. The manufacturer therefore achieves inventory cost reductions and convenience by following the teaching of the patent, but such benefits are not experienced by plumbers or do-it-yourself homeowners, or retailers on which they rely.

Furthermore, the kit of parts of the '307 patent is adapted for assembly using industrial equipment and custom fixturing. It is critical that sufficient torque be applied when assembling the valve of the '307 patent, particularly since tightening the connection fittings serves two purposes, namely, pre-loading the seals on the ball of the ball valve, and fixing the connection fittings to the valve housing. To satisfactorily pre-load the seals and to seal the brass-to-brass connection between the fitting and the valve body, a relatively high torque is required. This torque is easily reached with power fastening tools and fixtures designed to hold the valve body during tightening, without damaging the valve. However, since a user in the field cannot be expected to have specialized equipment for tightening of the connection fittings, offering the kit of parts of the '307 patent to such a user may be of no benefit.

Furthermore, factory assembly of the parts of the '307 patent permits leak testing of the valve open/close operation at the factory. Since the assembly of the valve core is completed by assembly of the connection fittings, providing the kit of parts of the '307 patent to a user in the field would eliminate the ability to test the valve operation prior to final installation of the valve.

What is required is a kit of parts from which a valve for connection with any of a wide variety of conduit configurations can be assembled, using ordinary hand tools. The closure member of the valve should be sealed and assembled independently of the connection fittings to permit factory assembly and leak-testing.

The above and other objects, features, and advantages of the present invention will be apparent in the following detailed description of the preferred embodiment thereof.

SUMMARY OF THE INVENTION

The present invention provides a kit of user-selectable parts from which a valve for connection with any of a wide variety of conduit configurations can be assembled, using ordinary hand tools.

In a first aspect of the invention, a kit of parts for field assembly of a shut-off valve with field selectable connection fittings is provided. The kit of parts includes a valve body, a plurality of connection fittings, and a plurality of gaskets. The valve body has a valve housing with three ports, wherein each of the ports has a longitudinal axis and a first connector end for receiving one of the connection fittings. The valve body has a valve closure member mounted within the valve housing, and a valve handle for moving the valve closure member between open and closed positions. The valve body has internal flow passageways for permitting the flow of fluid among said three ports through said valve closure member, and has a ball valve sealing structure to provide leak-proof operation of the valve closure member when moved between the open and closed positions. The ball valve sealing structure is assembled independent of the connection fittings received in the ports.

The first connector end of each of the ports has a first common configuration with a first seal surface.

Each of the plurality of connection fittings has a second connector end having a second common configuration with a second seal surface. Each of the plurality of connection fittings also has a different adaptor end.

The first connector ends of the ports are adapted to sealingly connect with the second connector ends of the plurality of connection fittings, using one of the plurality of gaskets, the gasket being positioned between the first and second seal surfaces of each of the ports and second connector ends.

In a second aspect of the invention, there is a gasket suitable for use with the kit of parts of the first aspect. The gasket is an annular disc of deformable metal having axially opposed first and second face surfaces and an inner diameter surface and outer diameter surface. The second face surface of the gasket is beveled relative to the second seal surface of the connection fitting such that the cross-sectional width of the gasket is wider at the inner diameter of the gasket and narrower at the outer diameter of the gasket. When a connection fitting is assembled finger tight into a port, the initial area of contact of the second face surface and the second seal surface is limited to a circle on the second face surface of the gasket located adjacent the inner diameter of the gasket.

The second aspect of the invention optionally includes provision for the first face surface of the gasket being beveled relative to the first seal surface. This is provided in one embodiment by beveling the first face surface of the gasket so that in cross section both the first and second face surfaces of the gasket taper inwardly from a widest point at the inner diameter to a narrowest point at the outer diameter of the gasket. Alternatively, this is provided by beveling the first seal surface of the first connector end of the port such that the first seal surface at its inner diameter is nearer to the outer end of the port than at its outer diameter.

The gasket may be of copper material or alternatively of aluminum material.

In a third aspect of the invention, there is an alternative gasket suitable for use with the kit of parts of the first aspect. The gasket is of an elastomeric material. The first seal surface of the port has at least one annular projection so that when tightening the connection fitting into the port, the elastomeric gasket is cut into at least two annular sections by the annular projection. The at least one annular projection makes metal-to-metal contact with the second seal surface, and at least one of the at least two annular sections of the elastomeric gasket is contained in a cavity bounded by the at least one annular projection, the first seal surface, and the second seal surface.

In an alternate embodiment of the third aspect of the invention, the first seal surface of the port has two concentric annular projections so that when tightening the connection fitting into the port, the elastomeric gasket is cut into three annular sections, namely an inner, middle, and outer annular section. The two annular projections make metal-to-metal contact with the second seal surface, and the middle annular section of the elastomeric gasket is contained in a cavity bounded radially by the two annular projections, and axially by the first seal surface and the second seal surface.

The elastomeric gasket of the third aspect of the invention is optionally of polytetrafluoroethylene (PTFE) material.

In a fourth aspect of the invention, a self-contained valve body for field assembly of a shut-off valve with field selectable connection fittings is provided. The valve body has a valve housing with a plurality of ports, each of the ports having a longitudinal axis and a first connector end for receiving a connection fitting. The valve body further has a valve closure member mounted within said housing, a valve handle for moving the valve closure member between open and closed positions, and internal flow passageways for permitting the flow of fluid among the plurality of ports through the valve closure member. The valve body also has a ball valve sealing structure to provide leak-proof operation of the valve closure member when in, and moving between, the open and closed positions. The assembly and operation of the ball valve sealing structure is independent of the connection fittings received in the ports.

In a fifth aspect of the invention, a connection structure providing a sealed joint between first and second fluid conducting parts is described. The connection structure has a first seal surface on the first part, a second seal surface on the second part, and an annular elastomeric gasket positioned between the first and second seal surfaces. The first and second seal surfaces interact upon assembly of the first and second parts to provide an enclosed annular cavity which traps and is filled with at least a portion of the elastomeric gasket.

In a sixth aspect of the invention, a connection structure providing a sealed joint between first and second fluid conducting parts is described. The connection structure has a first seal surface on the first part, a second seal surface on the second part, and an annular gasket of deformable metal positioned between the first and second seal surfaces. The annular gasket has an inner diameter surface, an outer diameter surface, and axially opposed first and second face surfaces adjacent the first and second seal surfaces, respectively, and the first and second seal surfaces and first and second face surfaces define joint contact surfaces. At least one of the joint contact surfaces is beveled relative to the joint contact surface adjacent the beveled surface, so that the cross-sectional width of the gasket is wider at the inner diameter of the gasket.

BRIEF DESCRIPTION OF THE DRAWINGS

FIG. 2 shows a valve body of the kit of parts of FIG. 1 in more detail.

FIG. 3 is a cross-sectional view of a closure member of the valve body shown in FIG. 2.

FIG. 4 is a front view of a spindle of the valve body shown in FIG. 2.

FIG. 5 is a side view of the spindle shown in FIG. 4.

FIG. 6 is a front view in section of a handle lever of the valve body shown in FIG. 2.

FIG. 7 is a side view in section of the handle lever shown in FIG. 6.

FIG. 11 is a front view of a brass sealing ring intended for use with the sealing structure shown in FIG. 10.

FIG. 12 is a side view in section of the brass ring shown in FIG. 10, in combination with an o-ring.

FIG. 13b is an enlarged view of the sealing structure of FIG. 13a.

FIG. 19 is a perspective view of a first gasket intended for use with the kit of parts shown in FIG. 1.

FIG. 20 is a cross-section of the gasket of FIG. 19.

FIG. 21 is a perspective view of an alternative gasket intended for use with the kit of parts shown in FIG. 1.

FIG. 22 is a cross-section of the gasket of FIG. 21.

DETAILED DESCRIPTION OF THE INVENTION

Figure 1:
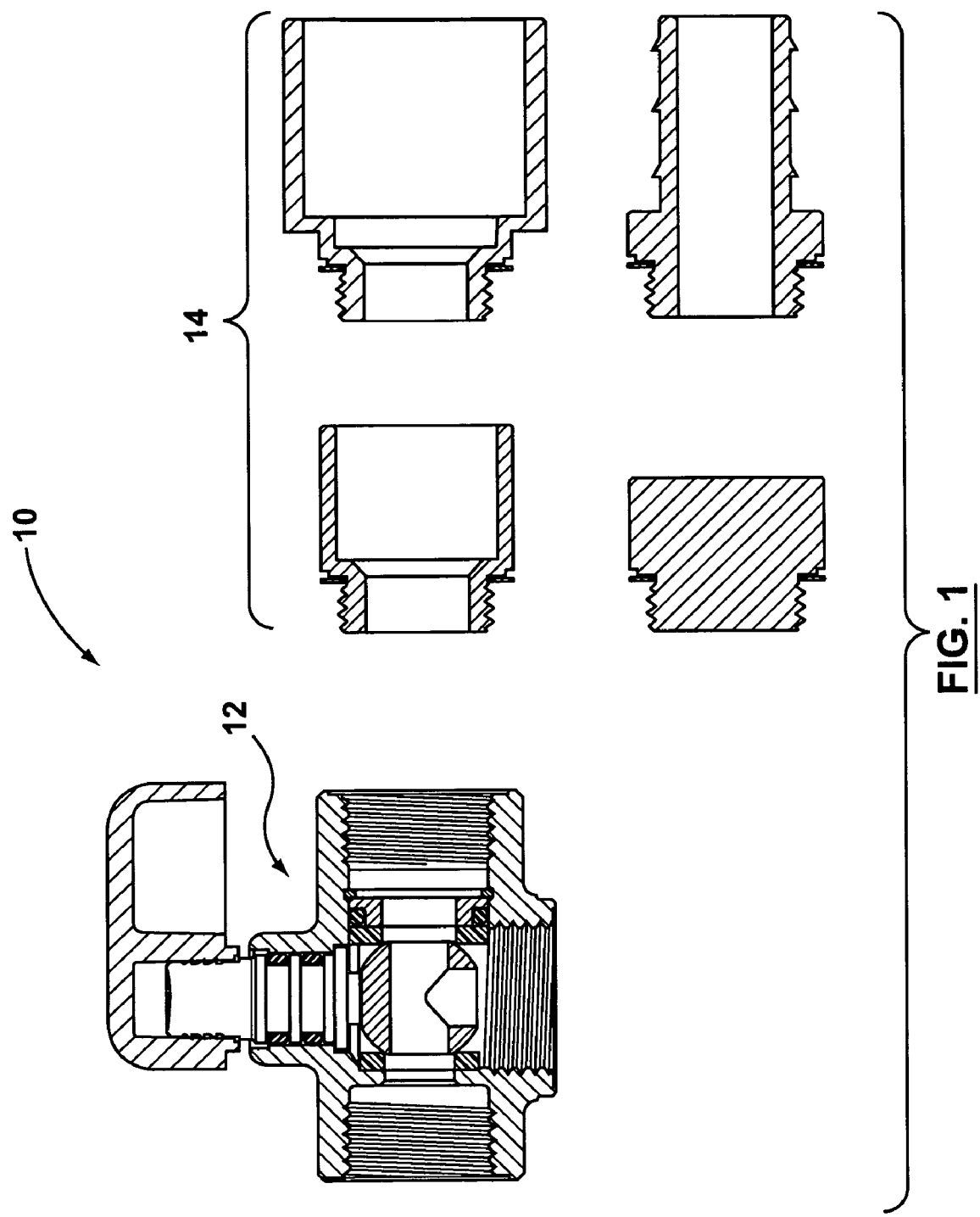
FIG. 1 shows a kit of parts according to one embodiment of the present invention with each of the parts shown in cross-section.

A kit of parts for assembly of a shut-off valve is shown generally at 10 in FIG. 1. The kit of parts 10 comprises a valve body 12 and a plurality of connection fittings 14. All connection fittings 14 have certain portions with a common configuration and certain portions with differing configurations.

Referring now to FIG. 2, the valve body 12 comprises a valve housing 20 having a valve closure member 22. The valve body 12 further comprises a spindle 24, a valve handle 26, and three ports 28a, 28b, and 28c. The 3 ports have a common configuration and can accept any of the parts 14 of the kit of parts 10.

As shown in FIG. 3, the valve closure member 22 comprises a sphere 30 as is used in what is commonly known as a "ball valve", but it is to be appreciated by one skilled in the art that any known valve closure member can be used to carry out the present invention.

The sphere 30 comprises three openings 32a, 32b, and 32c leading to channels 34a, 34b, and 34c, respectively. The openings 32a and 32b are disposed 90° apart on the surface of sphere 30, and the opening 32c is disposed 180° and 90° from openings 32a and 32b, respectively. The three channels 34a, 34b, and 34c intersect at approximately the center of sphere 30. An elongate slot 36 is provided in the surface of sphere 30 diametrically opposite opening 32b.

As can best be seen in FIGS. 4 and 5, the spindle 24 comprises a shaft 40 having a first cylindrical spindle portion 41 and a second rectangular spindle portion 42. The first cylindrical spindle portion 41 has a plurality of grooves 45 in which o-rings 46 are provided. A flange 47 is disposed between the first cylindrical spindle portion 41 and a tab 44. The tab 44 is adapted to engage the slot 36 of the sphere 30, so that rotation of the spindle 24 about its longitudinal axis causes corresponding rotation of the sphere 30. A plurality of barbs 48 are provided along the second rectangular spindle portion 42 of the shaft 40, for attachment to the valve handle 26.

The valve handle 26 can be actuated to effect the rotation of the spindle 24. As can be best seen in FIGS. 6 and 7, the valve handle 26 comprises a valve lever 50 which has a rectangular cross-section and length suitable to be comfortably grasped by a user. The valve lever 50 has a first lever end 52 and a second lever end 54. A rectangular bore 56 is provided in one longitudinal face 58 of the valve lever 50, axially positioned nearer to the first lever end 52 then to the second lever end 54. The rectangular bore 56 is adapted to receive the second rectangular spindle portion 42 of the shaft 40 in a press-fit arrangement.

Referring again to FIG. 2, each of the ports 28a, 28b, and 28c is characterized by a longitudinal bore having an axis 29a, 29b, and 29c respectively, and extending inward from the outer surface 21 of the valve housing 20 to the valve closure member 22. The three ports 28a, 28b, and 28c are disposed 90° apart about the valve closure member 22, having port 28b aligned diametrically opposite the spindle 24, and ports 28a and 28c aligned opposite each other. This arrangement of the three ports 28a, 28b, and 28c permits assembly of a straight valve, an angle valve, or a "T"-valve, as will be subsequently discussed. A cylindrical bore 27 is provided opposite port 28b and is adapted to sealingly receive the first cylindrical portion 41 of the shaft 40 of the spindle 24.

Figure 8:
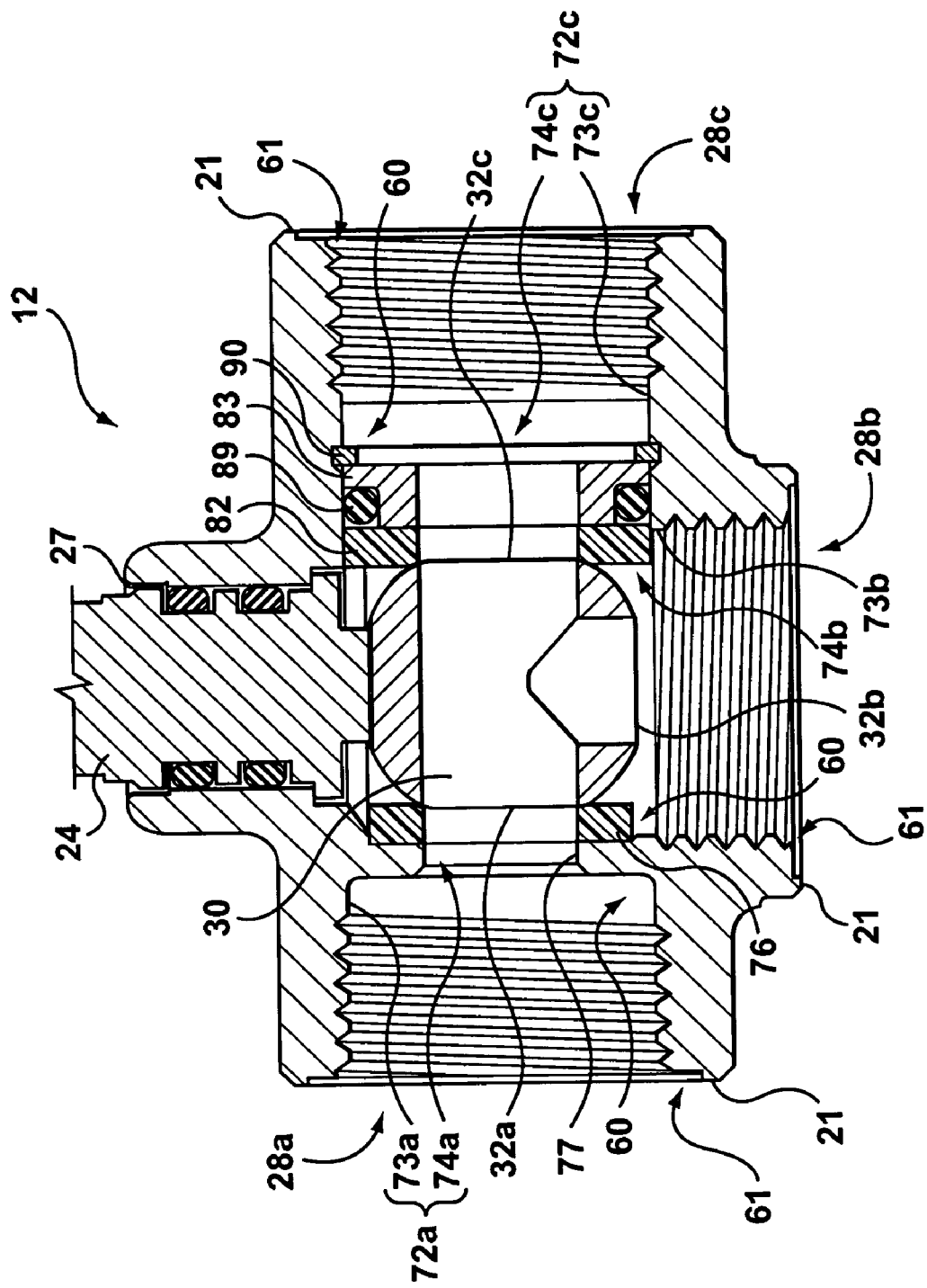
FIG. 8 is an enlarged cross-sectional view of a portion of the valve body shown in FIG. 2.

Referring now to FIG. 8, which shows a portion of valve body 12 in greater detail, each port 28 has an inner port end 60 nearest the sphere 30 of the valve closure member 22, and an outer first connector end 61 nearest the outer surface 21 of the valve housing 20.

Inner port configurations 72 are provided at the inner port ends 60 of each port 28. The inner port configurations 72 need not be common among the three ports 28. Each inner port configuration 72 comprises a port passageway 73 characterized by a longitudinal bore aligned coaxially with corresponding port 28. Each inner port configuration further comprises a valve closure member sealing structure 74 disposed between the port passageway 73 and the sphere 30 of the valve closure member 22. The inner port configurations 72 provide flow passageways which are not more restricted than the passageways defined by the inner diameter of the openings 32 in the sphere 30 of the valve closure member 22.

Figure 9:
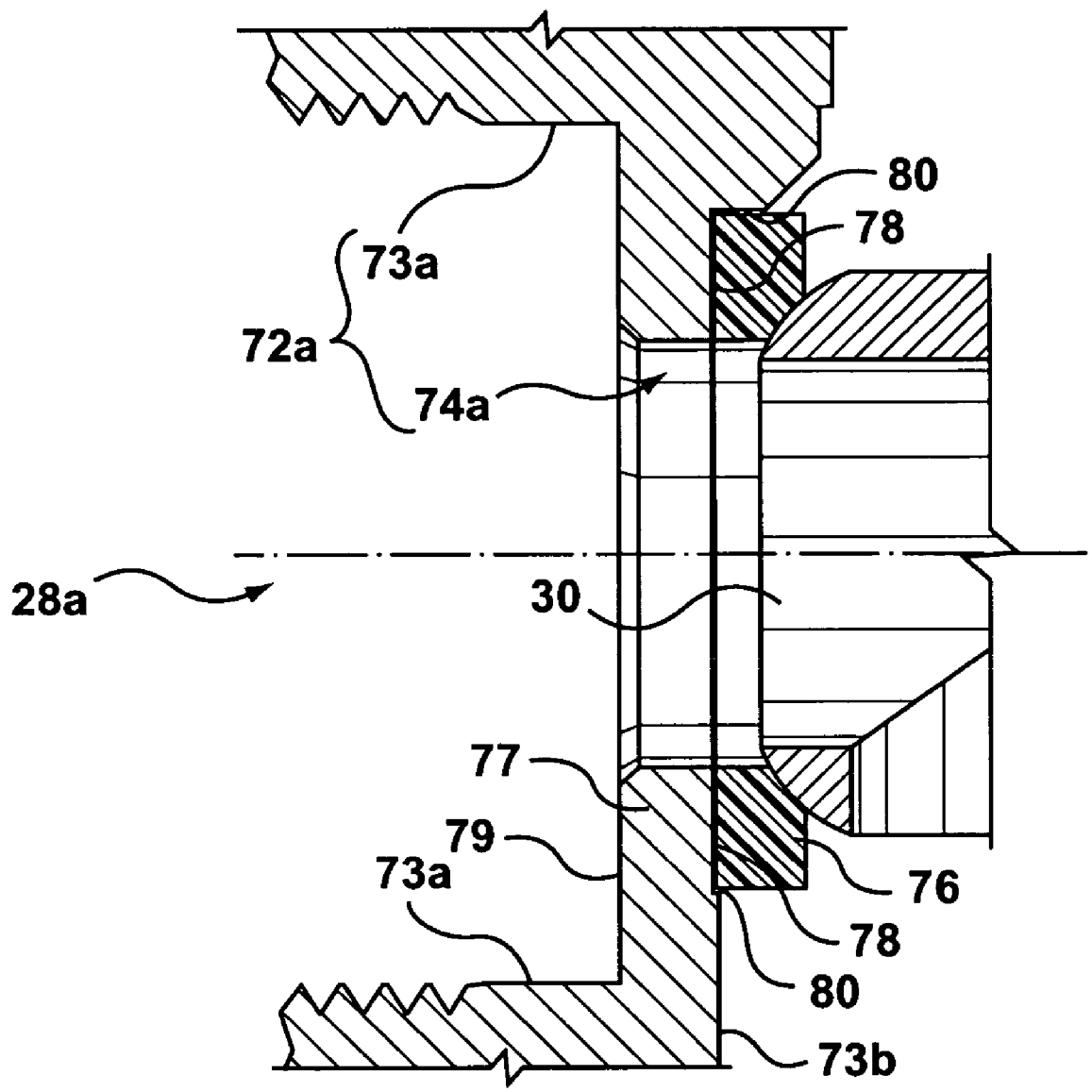
FIG. 9 is a cross-sectional view of a portion of the valve body shown in FIG. 2, showing one sealing structure in more detail.

Referring now to FIG. 9, the sealing structure 74a is provided in port 28a and has an annular seal 76 of polytetrafluoroethylene (PTFE) material disposed between the sphere 30 and an annular retaining lip 77. The retaining lip 77 extends radially inward from the inner surface of the port passageway 73a, and has inner and outer axially opposed faces 78 and 79, respectively. A substantially cylindrical seal seat 80 extends from the inner face 78, coaxial with the port 28a, having an inner diameter adapted to accommodate the annular seal 76. The seal seat 80 and the port passageway 73b of port 28b intersect, so that a portion of the seal seat 80 adjacent the port 28b is cut away and therefore not visible in the sectional plane of FIG. 9. The axial position of the retaining lip 77 along the port passageway 73a is such that the annular seal 76 is held against the surface of the sphere 30 once the valve body 12 has been assembled, as will be discussed subsequently.

Figure 10:
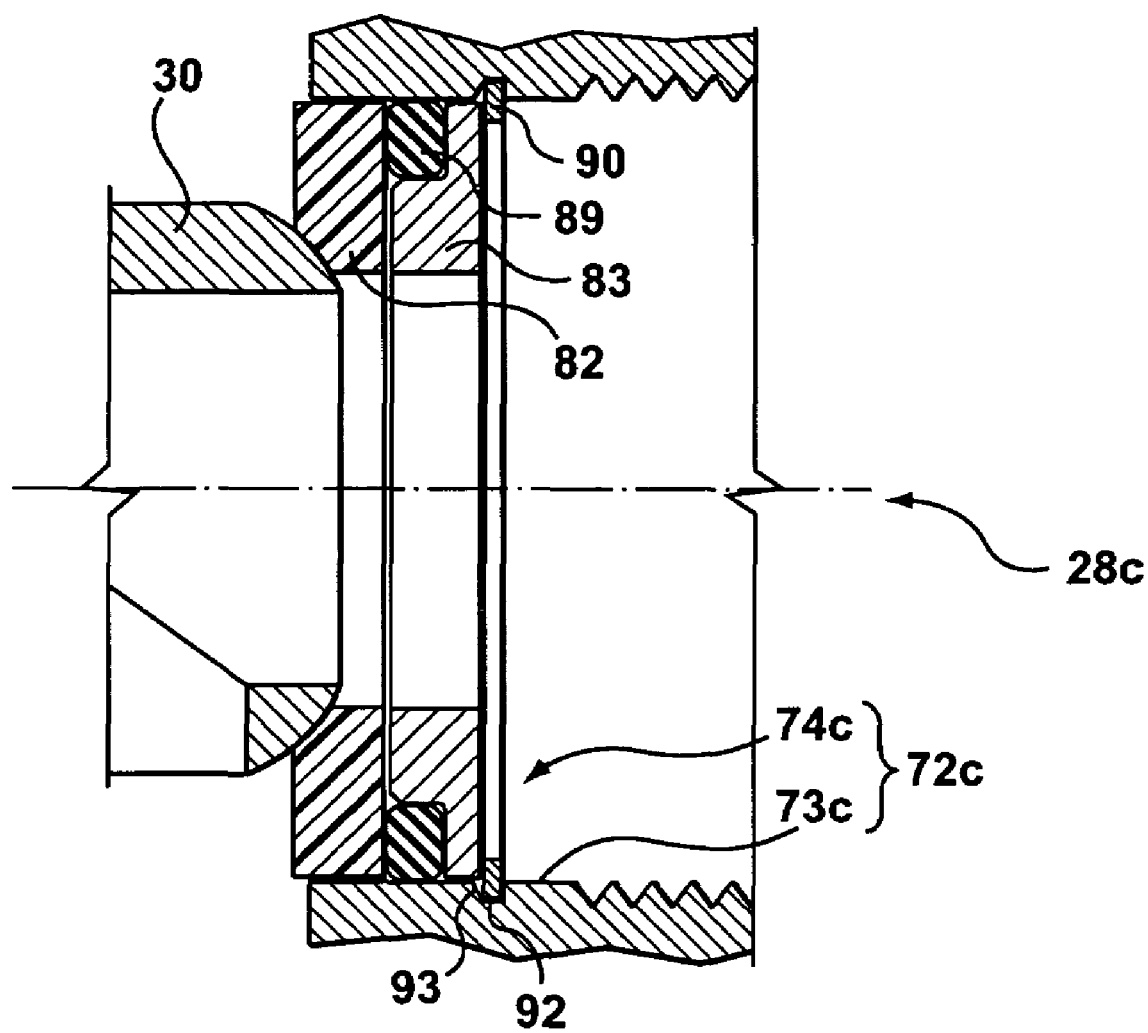
FIG. 10 is an enlarged cross-sectional view of another portion of the valve body shown in FIG. 2, showing another sealing structure in more detail.

Referring now to FIG. 10, the sealing structure 74c may be provided at the inner end 60 of the port 28c. The sealing structure 74c comprises an annular seal 82 of PTFE material disposed between the sphere 30 and a brass sealing ring 83. As best seen in FIGS. 11 and 12, the brass sealing ring 83 has inner and outer axially opposed faces 84 and 85. The outer diameter surface of the sealing ring 83 is stepped so that a first cylindrical portion 86 having a smaller outer diameter is adjacent the inner face 84, and a second cylindrical portion 87 having a larger outer diameter is adjacent the outer face 85. A chamfer 88 is provided at the corner of the first cylindrical portion 86 and the inner face 84, to facilitate assembly of an o-ring 89 which is provided on the first cylindrical portion 86.

Referring again to FIG. 10, the sealing structure 74c further comprises an internal retaining clip 90 which fits into an annular groove 92 provided in the inner surface of passageway 73c. The annular groove 92 has a bevelled inner radial wall 93 so as to increase the axial width of the groove 92 at the inner surface of the port passageway 73c and thereby facilitate assembly of the retaining clip 90. The internal retaining clip 90 contacts the second face 85 of the sealing ring 83 when assembled, and is provided at an axial position such that the valve body 12 may be satisfactorily assembled using the procedure described subsequently.

Figure 13A:
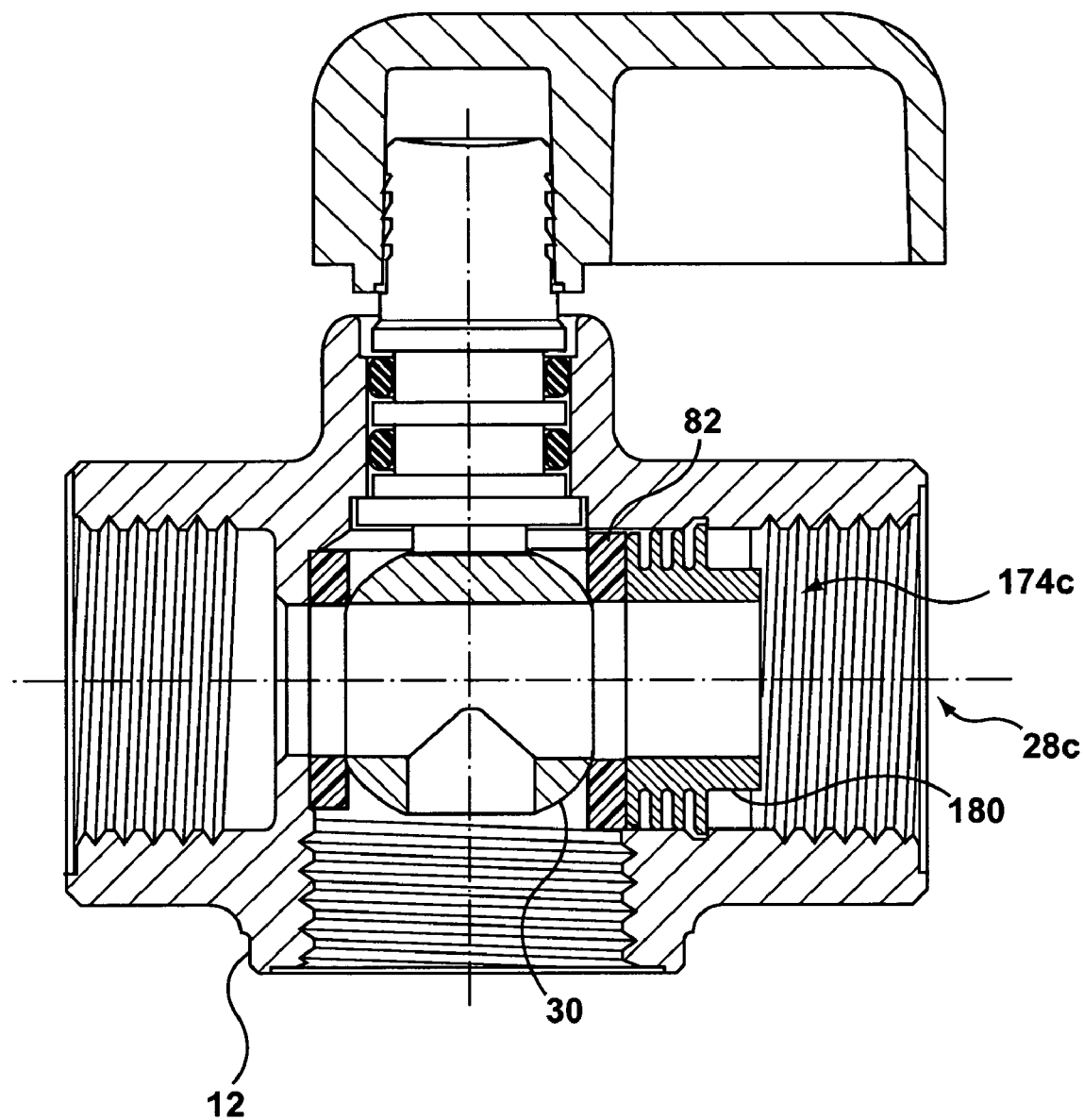
FIG. 13a is a cross-sectional view of a portion of the part shown in FIG. 2 with an alternative sealing structure.
Figure 13B:
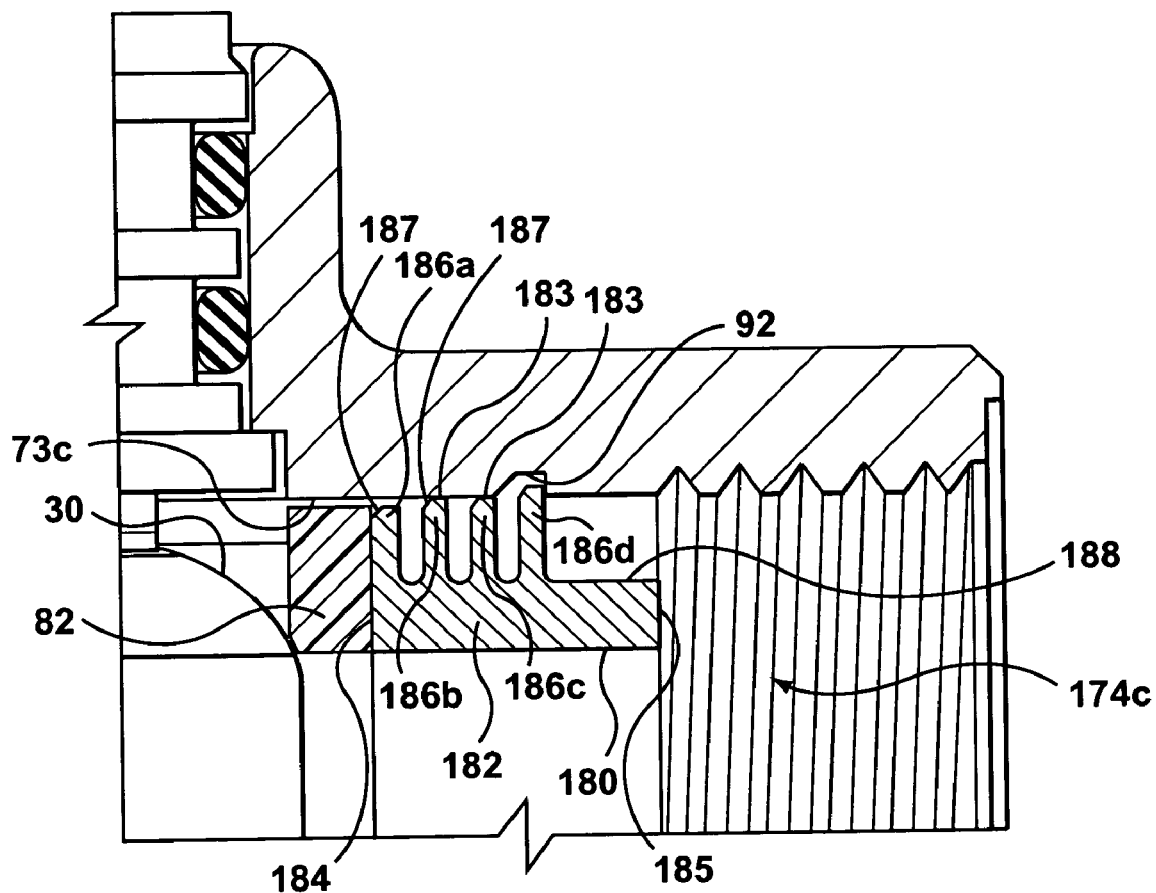

Referring now to FIGS. 13a and 13b, the sealing structure 174c may alternatively be provided at the inner end 60 of the port 28c. The sealing structure 174c comprises the annular seal 82 and a retaining sleeve 180. The annular seal 82 is constructed of PTFE material, and is disposed between the sphere 30 and the retaining sleeve 180.

The retaining sleeve 180 has a cylindrical body 182 with a first end 184 nearest the seal 82 and a second end 185 opposite the first end 184. The inner diameter of the retaining sleeve 180 is substantially the same size as the inner diameter of the annular seal 82. The outer surface of the cylindrical body 182 is provided with an outer contact surface 183 which engages the inner surface of the port passageway 73c in sealing press-fit engagement. The cylindrical body 182 may be provided with a series of radially outwardly extending ribs 186, and the outer contact surface 183 may be provided adjacent the outer diameter of one or more ribs 186.

Referring now to FIG. 13b, in one embodiment, the retaining sleeve 180 is provided with four annular ribs 186. A first rib 186a is positioned flush with the first end 184 of the sleeve 180, and has an outer diameter which is slightly less than the inner diameter of the passageway 73c of the port 28c, so that the first rib 186a may act as a pilot diameter when installing the sleeve 180 into the port 28c.

Second and third ribs 186b and 186c are positioned between the first rib 186a and a fourth rib 186d. The ribs 186b and 186c have an outer diameter which is slightly larger than the inner diameter of the passageway 73c of the port 28c so as to provide a press-fit interaction with the inner diameter of the passageway 73c of the port 28c. The outer contact surface 183 is provided adjacent the outer diameter of the annular ribs 186b and 186c.

The fourth rib 186d is provided at a position along the axial length of the sleeve 180 between the third rib 186c and the second end 185 of the sleeve 180. The fourth rib 186d has an outer diameter which is greater than the inner diameter of the passageway 73c, and may be larger than the outer diameter of ribs 186b and 186c. The sealing structure 174c also comprises the annular groove 92 provided in the inner surface of the passageway 73c as in sealing structure 74c, and the fourth rib 186d may be sized so that the rib 186d seats within the annular groove 92. This arrangement provides additional retention force for holding the sleeve 180 in the port 28c.

Each of the four ribs 186 may be provided with a chamfer 187 at the outer edge of the radial surface facing towards the seal 82. This may facilitate assembly of the sleeve 180 into the port 28c.

Referring again to FIG. 13b, the sleeve 180 may be provided with an axial extension 188, defined by a portion of the body 182 extending beyond the axial position at which the fourth rib 186d is provided, in a direction opposite the first end 184 of the sleeve 180. The extension portion 188 of the sleeve 180 may provide contact surfaces to facilitate the manipulation and assembly of the sleeve 180 into the port 28c. The extension portion 188 may also serve to simply extend the length of the body 182 and thereby improve flow characteristics of fluid flowing between the sphere 30 and the connection fitting 14 installed in the port 28c.

Although the overall length of the sleeve 180 may be extended by the extension portion 188, the length is sufficiently short so that when the sleeve 180 is assembled into the port 28c, clearance is provided between the second end 185 of the sleeve 180 and the leading surface 104 of the connection fitting 14 installed in the port 28c.

Figure 14:
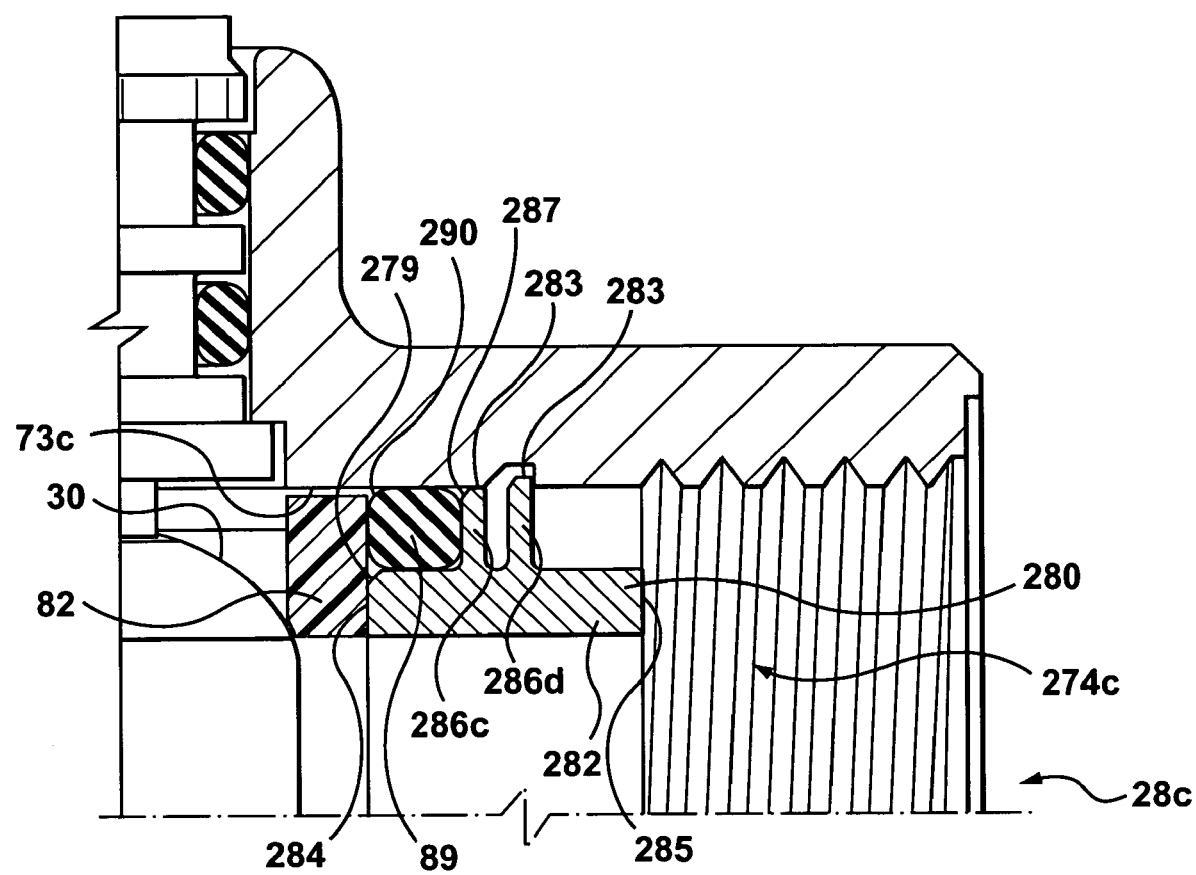
FIG. 14 is an enlarged cross-sectional view showing a further alternative sealing structure for use with the valve body of FIG. 2.

Referring now to FIG. 14, a further alternative sealing structure 274c may be provided in the port 28c. The sealing structure 274c has a retaining sleeve 280 which is provided with only two ribs 286c and 286d, corresponding to the ribs 186c and 186d of the sleeve 180. The axial position of the rib 286c along the body 282 of the sleeve 280 is such that an annular cavity 290 is provided in front of the rib 286c, bounded by the body 282, the seal 82, and the inner surface of the passageway 73c. The o-ring 89 is provided in the cavity 290 to enhance the sealing action of sealing structure 174c. A chamfer 279 is provided at the edge along the outer diameter of the first end 284 of the sleeve 280, to facilitate assembly with the o-ring 89, as will be described subsequently.

The valve body 12 is assembled by first installing the spindle 24 into the valve housing 20. The spindle 24 is installed by using the port 28b for access, and inserting the rectangular portion 42 of the shaft 40 through the cylindrical bore 27 of the valve housing 20. The spindle 24 is pushed through the cylindrical bore 27 until the flange 47 butts up against the inner end of the cylindrical bore 27. At this point the valve handle 26 can be assembled by aligning the bore 56 with the rectangular portion 42 and pressing the handle 26 on the shaft 40 while holding the shaft 40 in position relative to the housing 20. The tab 44 extending from the shaft 40 is then aligned so the longitudinal axis of the tab 44 is parallel to axes 29a and 29c of ports 28a and 28c respectively.

Next, the annular seal 76 is seated in the cylindrical seal seat 80 of the retaining lip 77, using the port 28c for access. The sphere 30 is then installed through the port 28c, and is positioned against the seal 80 ensuring that the slot 36 of the sphere 30 engages the tab 44 of the spindle 24. Assembly of the valve body 12 may be completed by installing the sealing structure 74c in the port 28c. To do so, the annular seal 82 is inserted in port 28c and positioned against the sphere 30 so that it surrounds the opening 32c. The o-ring 89 is then positioned against the annular seal 82, and the brass ring 83 is then inserted so that the chamfer 88 of the brass ring 83 contacts the inner diameter of the o-ring 89. The inner face 84 of the brass ring 83 is then pressed through the o-ring 89, using the chamfer 88 to guide the o-ring 89 into position on the first cylindrical portion 86 of the brass ring 83. The valve body 12 is then pre-loaded by pressing the outer face 85 of the brass ring 83 axially towards the retaining lip 77, and locking the assembly in place by inserting the internal retaining clip 90 into the groove 92.

Assembly of the valve body 12 may be alternatively be completed by installing the sealing structure 174c in the port 28c. This can be done by inserting the annular seal 82 in the port 28c and positioning the seal 82 against the sphere 30 so that it surrounds the opening 32c. The retaining sleeve 180 may then be pressed into position in the port 28c, using the first rib 186a to guide the sleeve 180 through the passageway 73c.

Alternatively, the sealing structure 274c may be provided in the port 28c to assemble the valve body 12. Accordingly, after inserting the seal 82, the o-ring 89 is inserted through the port 28c and positioned against the annular seal 82. The sleeve 280 is then inserted so that the chamfer 279 of the sleeve 280 contacts the inner diameter of the o-ring 89. The first end 284 of the sleeve 280 is then pressed through the o-ring 89, using the chamfer 279 to guide the o-ring 89 onto the body 282 of the sleeve 280. The sleeve 280 is then pressed into its assembled position, thereby accurately pre-loading the valve seals 76 and 82, sealing the interface between the sleeve 280 and the passageway 73c, and securing the sleeve 280 in position.

Assembly of the valve body 12 provides a fully functional pre-assembled valve body which is ready for use by a plumber, pipefifter, or do-it-yourself homeowner. Assembly of the valve body in a manufacturing environment enables the valve body to have the same level of quality associated with fully assembled ready-to-use valves, and yet offer the convenience of a user-configurable valve. The user need only select appropriate connection fittings 14 and install these fittings in the corresponding ports 28.

Figure 15:
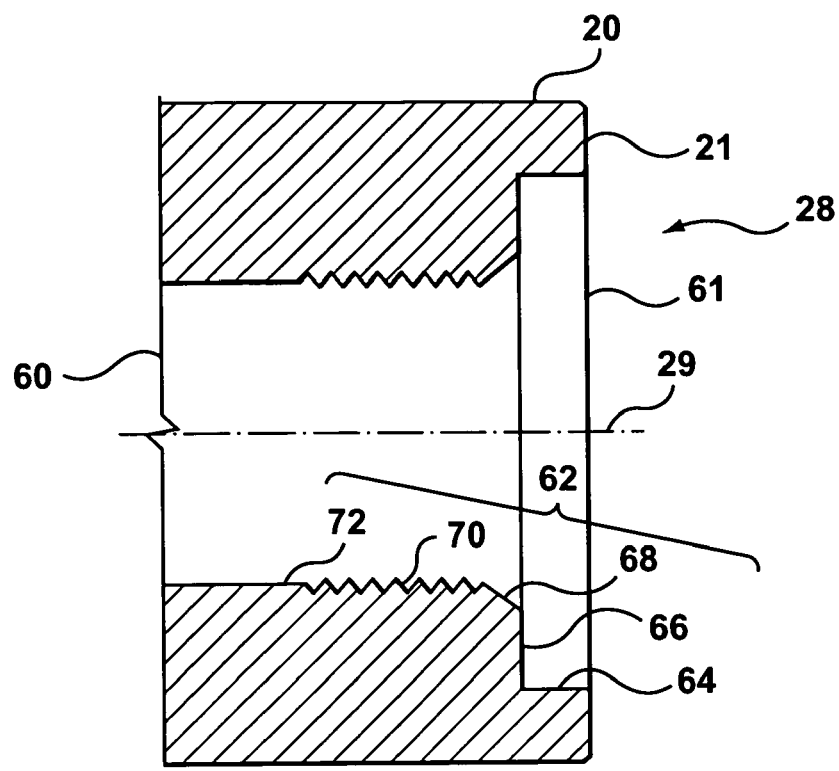
FIG. 15 is a cross-sectional view of another portion of the valve body shown in FIG. 2 in more detail.

Referring now to FIG. 15, each port 28 has an inner port end 60 nearest the valve closure member 22, and an outer first connector end 61 nearest the outer surface 21 of the valve housing 20. The first connector end 61 of each port 28 has a first common configuration 62, comprising a stepped bore having features along its length described below.

Nearest the outer surface 21 of the valve housing 20, the first common configuration 62 comprises an internal clearance wall 64 extending parallel to and coaxial with the axis 29 of the port 28. The internal clearance wall 64 terminates at a first seal surface 66, which extends radially inward from and substantially perpendicular to the clearance wall 64. A thread lead 68, defined by a bevelled surface extending radially inward and axially towards the inner port end 60, is disposed about the entrance to an internally threaded bore 70.

Figure 16:
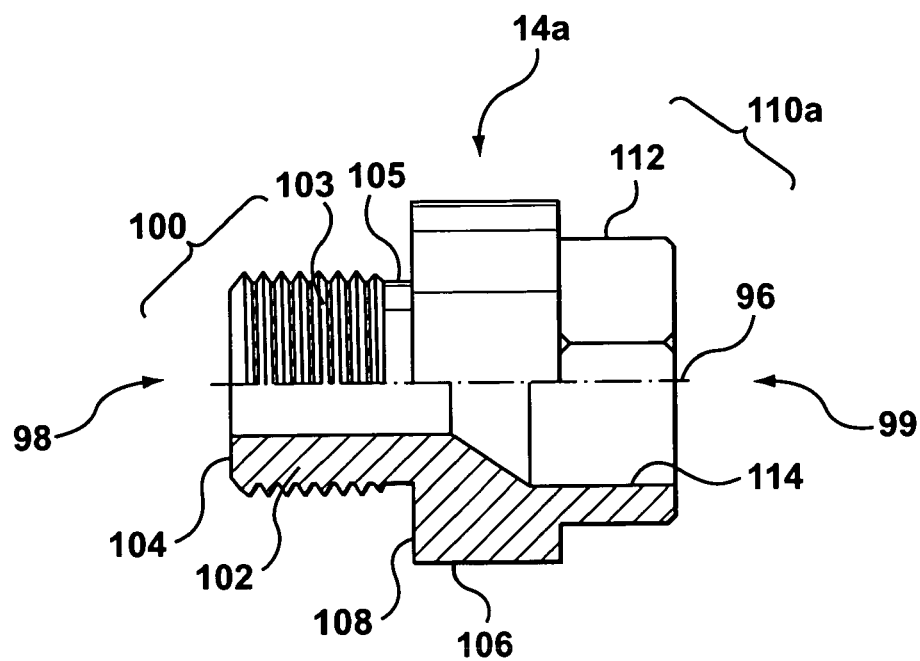
FIGS. 16-18 are partial cross-sectional views of different connection fittings of the kit of the parts shown in FIG. 1.
Figure 17:
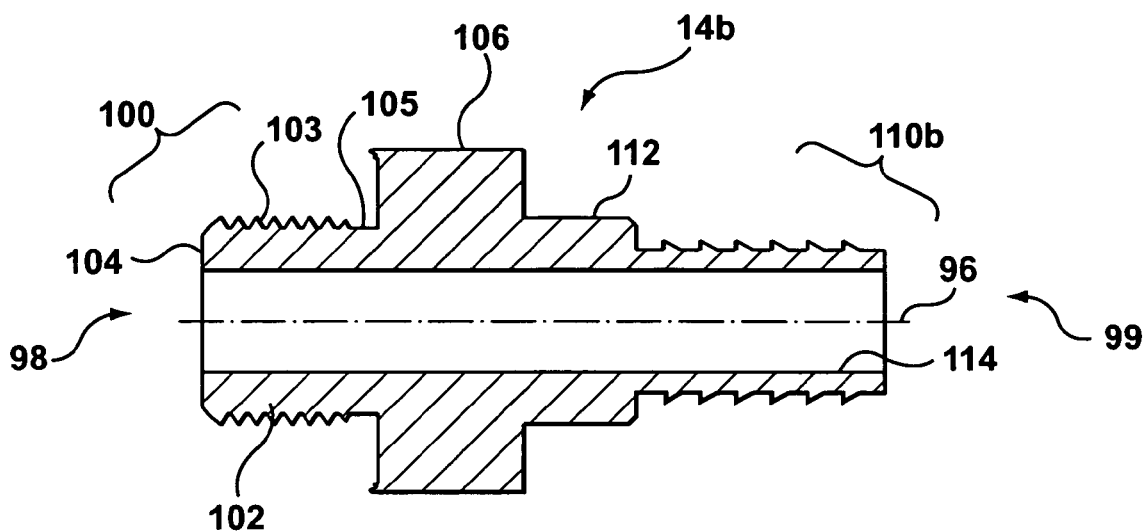
Figure 18:
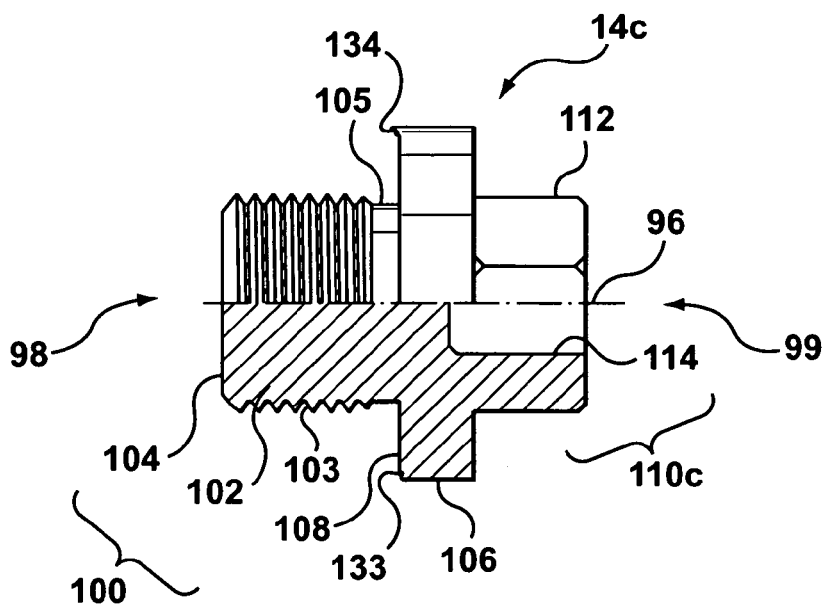

The plurality of connection fittings 14 will now be described. A representative sample of the connection fittings 14a, 14b, and 14c is shown in FIGS. 16, 17, and 18, respectively. Preferably the kit of parts 10 would comprise many more than three types of connection fittings, and many multiples of each type, but these three have been illustrated to serve as example. All such connection fittings 14 have a portion having a common configuration. This will be discussed in detail first.

Each connection fitting 14 is elongate having an axis 96 and two axially opposed ends, namely a second connector end 98 and an adaptor end 99. The second connector end 98 of each one of the plurality of connection fittings 14 has a second common configuration 100, adapted to interact with first common configuration 62 of any one of the ports 28 of the valve housing 20. The second common configuration 100 preferably comprises a first cylindrical portion 102 coaxial with the axis 96, having a male threaded portion 103 and an undercut portion 105. The male threaded portion 103 mates with the internal threaded portion 70 of the first connector end 61. A leading annular surface 104 is provided on one face of first cylindrical portion 102, and is defined by an annular surface disposed perpendicular to and coaxial with the axis 96, extending radially inward from the outer diameter of first cylindrical portion 102 to an inner diameter which is not less than the diameter of the opening 32 in the sphere 30. The combined axial length of the male threaded portion 103 and the undercut portion 105 is sized to permit assembly of the connection fitting 14 in the port 28, as described in greater detail subsequently.

The second common configuration 100 further comprises a second cylindrical portion 106 coaxial with the axis 96, and adjacent to the first cylindrical portion 102, and axially opposite to the leading annular surface 104. The second cylindrical portion 106 has an outer diameter greater than that of the first cylindrical portion 102, but less than the internal diameter of the clearance wall 64. The radial surface at the transition in outer diameters between the first cylindrical portion 102 and the second cylindrical portion 106 extends substantially perpendicular to the axis 96 and defines a second seal surface 108.

The adaptor ends 99 of the plurality of connection fittings 14 do not share a common configuration. Rather, any one adaptor end 99 has an adaptor configuration 110 which varies among the connection fittings 14. Referring again to FIGS. 16, 17, and 18, examples of specific adaptor configurations 110 include a female pipe adaptor configuration 14a (FIG. 16), a male barb adaptor configuration 14b (FIG. 17), and a plug configuration 14c (FIG. 18). Other adaptor configurations (not shown) include configurations for compression fittings, hose connections, flare connections, crimp connections, and threaded pipe connections and any other type of plumbing connection configuration. All of these configurations are well known in the art and may be included in the variety of adaptor configurations 110 provided on the adaptor ends 99 of the plurality of connection fittings 14.

Preferably, any one adaptor configuration 110 is provided with parallel diametrically opposite lands 112 along the outer surface of the adaptor end 99. This enables the adaptor end 99 to be gripped by a wrench. The parallel lands 112 may comprise a hexagon of sufficient width to accommodate the jaws of a wrench. The arrangement of, and distance between, the parallel lands 112 may vary between adaptor configurations 110.

Each adaptor configuration 110 is also provided with a particular axial passageway 114. However, in the case of an adaptor acting as a plug, the particular passageway 114 is blind so that the connector when used acts as a plug for a port 28. The configuration of the passageway 114 may differ among the various connection fittings 14 to meet the needs of the particular connection. The passageway 114 is the passageway for fluid but depending on the next component of the piping system, the passageway 114 may also accept tubing, piping or other structure. The internal wall of the axial passageway 114 may be adapted to fit an Allen key for turning, rather than providing lands 112 if desired, as shown in FIG. 16.

Equipped with the kit of parts 10, a user can select the particular connection fittings from the plurality of connection fittings 14 which have adaptor ends 99 with adaptor configurations 110 suitable for connection to the conduits between which the assembled shut-off valve is to be installed.

For example, assume that a shut off valve is required between a copper pipe and plastic hose disposed at 90° relative to each other. An angle valve having one female pipe connection and one barb connection is required. This can be assembled from the kit of parts 10 by selecting fitting 14a for port 28a, fitting 14b for port 28b, and fitting 14c for port 28c.

Once the appropriate connection fittings 14a, 14b, and 14c have been selected from the kit of parts 10, each connection fitting 14a, 14b, and 14c must be assembled to the corresponding ports 28a, 28b, and 28c. According to the present invention, this assembly should produce a leak-proof joint between each connection fitting 14 and each corresponding port 28, using ordinary hand tools to support valve body 12 and tighten connection fitting 14.

It was expected that a satisfactory joint could be assembled by using a gasket as is commonly practiced in the art. Gaskets for connection fittings are typically annular in shape, having axially opposed faces which are flat and perpendicular to the axis of the gasket. The gaskets are typically of an easily deformable metal, such as copper or aluminum, or of an elastomeric material such a polytetrafluoroethylene (PTFE).

When attempting to use such a gasket in assembling the connection fittings 14 to the valve body 12 using ordinary hand tools, it was found that a leak-proof joint could not reliably be achieved. This appeared to be a result of imperfections in the second seal surface 108 of the connection fittings 14, particularly at the outer circumference of the second seal surface 108. As seen in FIG. 18, these imperfections consist of nicks 133 which may be caused by transporting or handling the plurality of connection fittings 14, and/or raised imperfections 134 resulting from build-up during the plating process. The nicks 133 may leave gaps in the joint through which fluid can leak. The raised imperfections 134 tend to gouge and score adjacent gasket surfaces during tightening, leaving troughs through which fluid can leak.

In the present invention these problems have been overcome by using modified gaskets and seal surfaces as described below.

Figure 30:
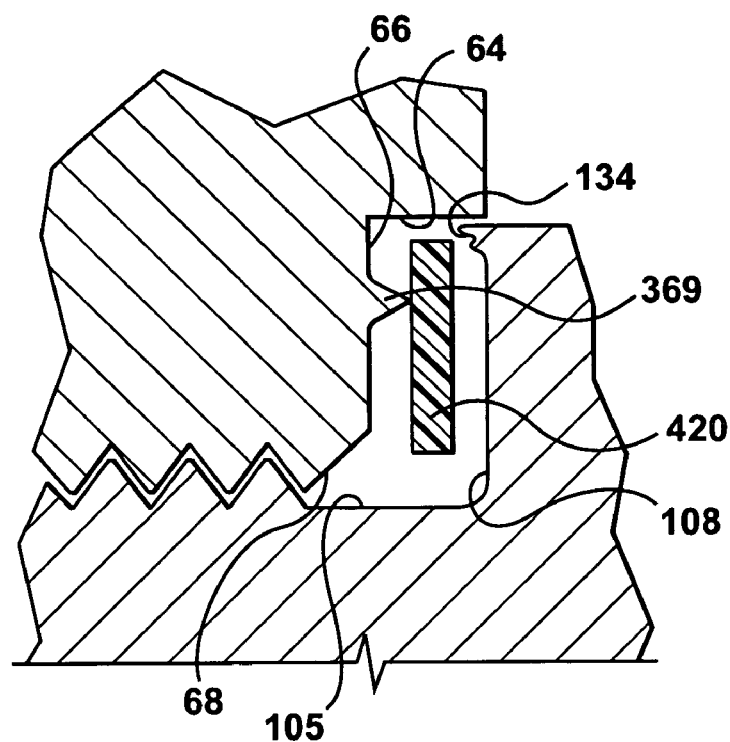
FIG. 30 is a view similar to FIG. 28 but showing parts of the kit of FIG. 1 having an alternative sealing surface.

In a first embodiment the connection is made using a gasket 120. Referring now to FIG. 19, the gasket 120 comprises an annular disc of deformable metal such as copper or aluminum, having an axis 121. The inner diameter surface 128 of the gasket 120 is sized to fit over the first cylindrical portion 102 of the connection fitting 14. The outer diameter surface 126 of the gasket 120 is sized to fit within the clearance wall 64 of the port 28. As best seen in FIG. 30, the outer surface 126 of the gasket 120 optionally comprises a plurality of radially outward extending projections 150 spaced equally about the circumference of the outer surface 126. The outer diameter 152 on which the radially outermost points of the projections 150 lie is sized to provide a press-fit assembly of the gasket 120 in the clearance wall 64 of the port 28. This permits pre-assembly of the gasket 120 in the valve body 12, thereby ensuring the presence and concentric positioning of the gasket 120 in the port 28 during assembly of the connection fitting 14.

Referring again to FIG. 19, the gasket 120 further comprises a first face surface 122 and a second face surface 124 axially opposed to one another. When the joint formed by connecting one of the plurality of the connection fittings 14 to one of the ports 28 is finger tight, the first face surface 122 of the gasket 120 is in contact with the first seal surface 66 of the valve housing 20, and defines a first joint interface 130 (FIG. 23), and the second face surface 124 of the gasket 120 is in contact with the second seal surface 108 of the second connector end 98, and defines a second joint interface 132. This is best seen in FIG. 23.

Figure 23:
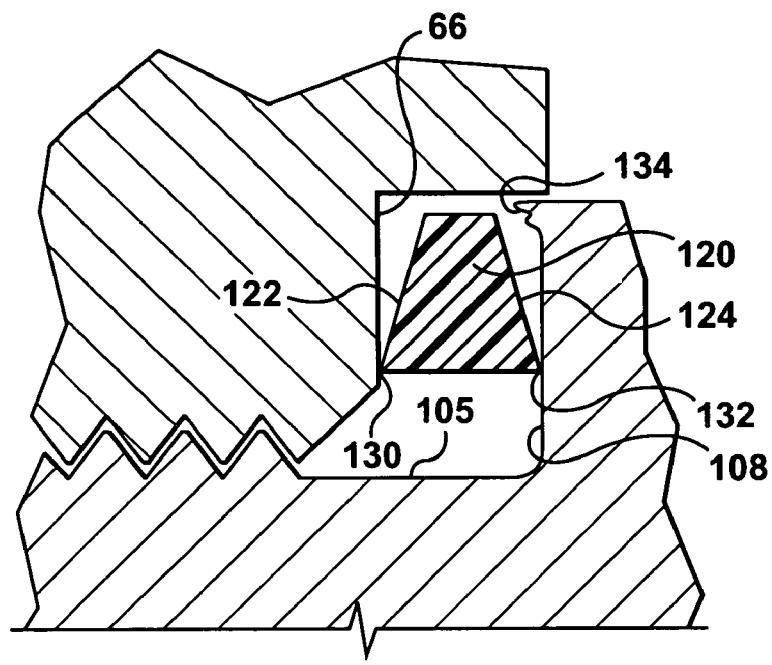
FIG. 23 is a cross-sectional view of a portion of two parts of FIG. 1 and the gasket of FIG. 19 shown in an assembled but pre-tightened state.

To achieve a desired seal in the embodiment of FIG. 23, the first and second face surfaces 122 and 124 of the gasket 120 are bevelled, rather than perpendicular to the axis 121 of the gasket 120. This is best seen in FIG. 20. The bevelled first and second face surfaces 122 and 124 are disposed such that the outer diameter surface 126 is narrower than the inner diameter surface 128 of the gasket 120, and the cross-sectional profile of the gasket 120 is symmetrical about an axis 129 extending perpendicular to axis 121 through the center of the cross-section of the gasket 120.

As is best seen in FIG. 23, the pre-tightened first and second joint interfaces 130 and 132 have minimal contact surface area, approximating point contact when viewed in cross-section, or line contact when viewed axially. Furthermore, clearance is provided between the second face surface 124 of the gasket 120 and the raised imperfections 134 extending from the second seal surface 108.

Upon application of a tightening torque to the adaptor end 99 of the connection fitting 14, the connection fitting 14 advances axially and places an axial load on the gasket 120. This axial load causes deformation of the gasket 120, characterized by a flattening of the bevelled first and second gasket faces 122 and 124 at the first and second joint interfaces 130 and 132, so that the flattened portions of the bevelled first and second gasket faces 122 and 124 lie in flush contact with the first and second seal surfaces 66 and 108.

Figure 24:
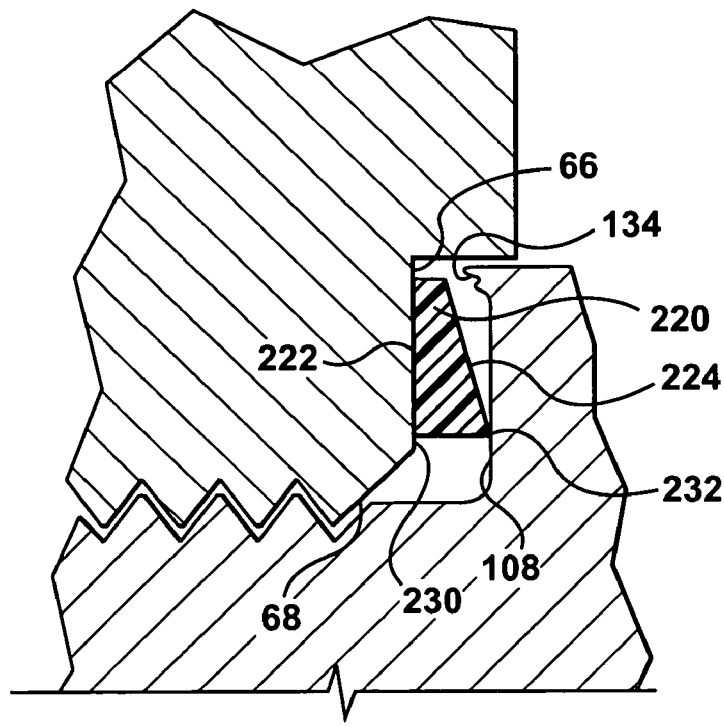
FIG. 24 is a cross-sectional view of a portion of two parts of FIG. 1 and the gasket of FIG. 21 shown in an assembled but pre-tightened state.

In another embodiment of the gasket best seen in FIGS. 21, 22, and 24, a gasket 220 is used to achieve a reduction in surface area of the pre-tightened second joint interface 232 only, and to provide clearance between the raised imperfections 134 and the second gasket face surface 224. The first face surface 222 of the gasket 220 is aligned perpendicular to the axis 221 of the gasket 220 so that the first face surface 222 of the gasket 220 sits flush against the first seal surface 66 when the joint is pre-tightened. As a result, the first joint interface 230, defined by contact between the first seal surface 66 and the first face surface 222 of the gasket 220, has a surface area equal to the surface area of the first face surface 222.

As best seen in FIG. 24, the bevelled second face surface 224 of the gasket 220 provides a reduced contact surface area of the second joint interface 232, and clearance between the raised imperfections 134 and the second face surface 224.

Figure 25:
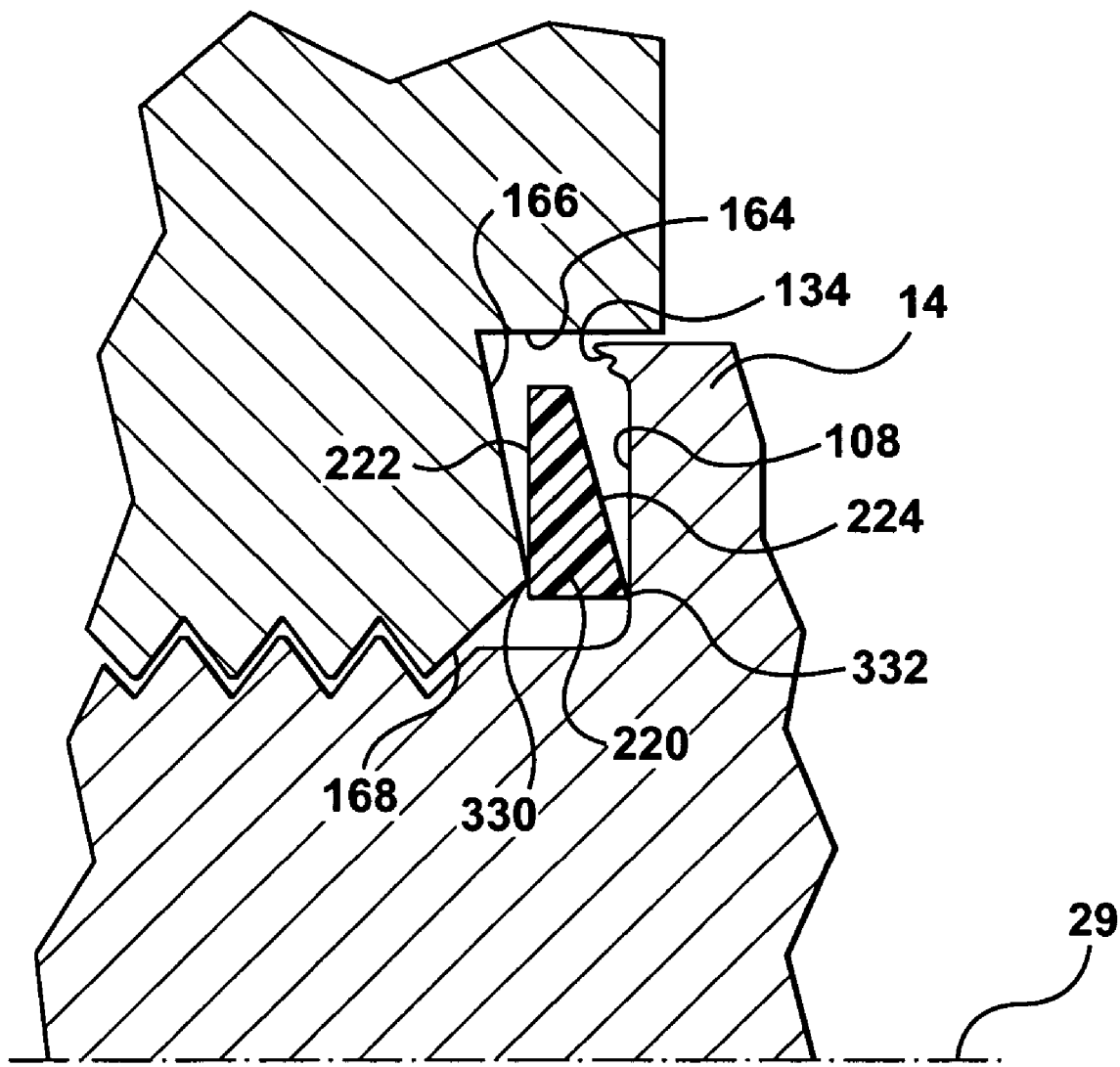
FIG. 25 is a cross-section similar to FIG. 22 but using an alternate form of one of the parts of FIG. 1.

In yet another embodiment, best seen in FIG. 25, a modified seal surface 166 is provided on the valve housing 20. The first seal surface 166 is bevelled relative to the first face surface 222 of the gasket 220, such that the first seal surface 166 slopes deeper away from the connection fitting 14 as surface 166 extends from its inner diameter to its outer diameter at clearance wall 164.

In the pre-tightened state, a first joint interface 330 exists at the point of contact between the inner diameter of the first seal surface 166 and the first face surface 222 of the gasket 220. A second joint interface 332 exists at the point of contact between the inner diameter of the second face surface 224 of the gasket 220 and the second seal surface 108 of the connection fitting 14.

Upon tightening, deformation of the gasket 220 at the second joint interface 332 and clearance between the raised imperfections 134 and the second face surface 224 of the gasket 220 is provided as in the previous embodiment. Deformation of the gasket 220 at the first joint interface takes the form of a pointed annular depression which mates with and surrounds the first seal surface 166 and the thread lead 168 in the vicinity where they meet at the first joint interface 330. In all these alternatives, contact with the imperfections 164 and resultant damage to the seal is reduced. Because of the minimal area of contact at at least one joint interface, hand tool torque is sufficient to deform the gasket to make a satisfactory seal, while using a deformable metal gasket.

In other applications it may be desirable to exploit the sealing properties of an elastomeric gasket, such as polytetrafluoroethyene (PTFE). Such gaskets are known to provide sealed joints with excellent initial leak-proof properties, but the elastomeric material tends to creep under load which in turn allows the joint to loosen over time, causing leaks.

We have discovered this problem may be overcome by providing a sealing structure which pierces the elastomeric gasket to capture at least a portion of the elastomeric material within an enclosed cavity created by assembly of the joint. With the elastomeric material enclosed within and filling the cavity, the material cannot creep.

Figure 26:
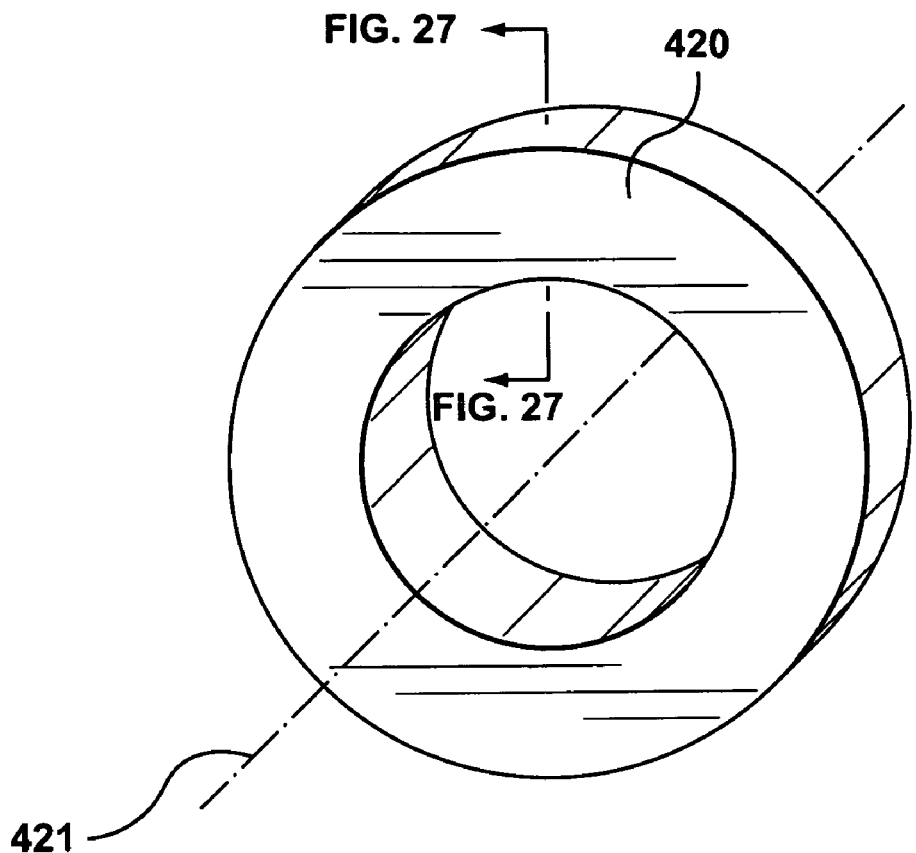
FIG. 26 is a perspective view of an alternative embodiment of a gasket intended to be used with the kit of parts shown in FIG. 1.
Figure 27:
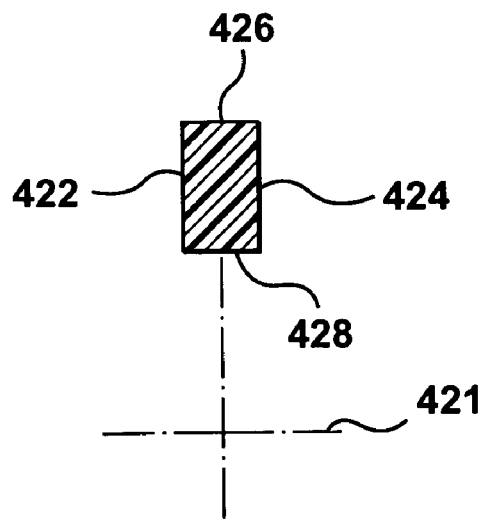
FIG. 27 is a cross-sectional view of the gasket of FIG. 26.
Figure 33:
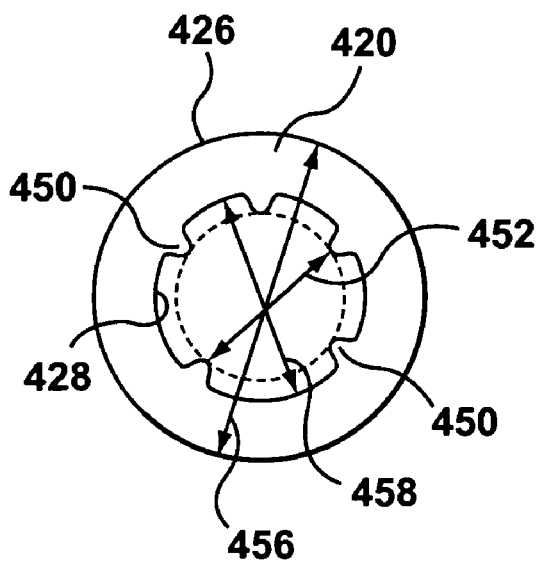
FIG. 33 is a front view of the gasket of FIG. 26 showing optional features.

An elastomeric gasket 420 is shown in FIG. 26. The gasket 420 is an annular disc of elastomeric material, disposed about an axis 421. Referring to FIGS. 26 and 27, the gasket 420 has a rectangular profile in cross-section, having a first face surface 422 and an axially opposed second face surface 424, such that the face surfaces 422 and 424 are parallel to each other and perpendicular to the axis 421. The gasket 420 further comprises an inner diameter surface 428 and outer diameter surface 426. Referring now to FIG. 33, the inner diameter surface 428 has a diameter 458 greater than the outer diameter of the threaded portion 103 of the connection fitting 14. The outer diameter surface 426 has a diameter 456 less than the diameter of the clearance wall 64 of the first common configuration 62 of the ports 28. As best seen in FIG. 33, the inner diameter surface 428 of the gasket 420 optionally comprises a plurality of radially inward extending projections 450 spaced equally about the circumference of the inner diameter surface 428. The inner diameter 452 on which the radially innermost points of the radial projections 450 lie is sized to be smaller than the outer diameter of the male threaded portion 103 of the connection fitting 14, but larger than the outer diameter of undercut portion 105. This permits pre-assembly of gasket 420 on to connection fitting 14 by pushing gasket 420 over and past the male threaded portion 103 onto the undercut portion 105, thereby ensuring the presence and concentric positioning of the gasket 420 in the port 28 during assembly of the connection fitting 14.

Figure 28:
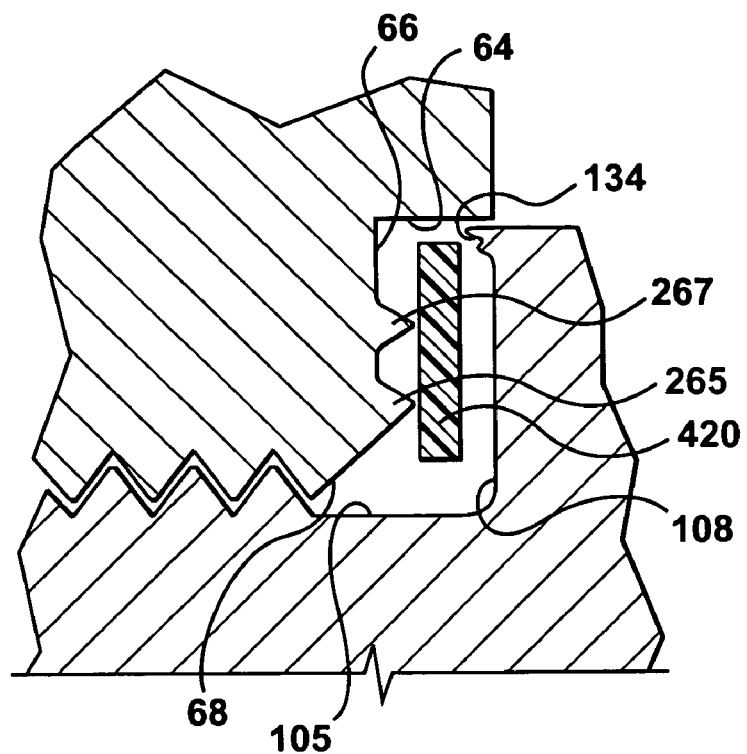
FIG. 28 is a cross-sectional view of a portion of two parts of the kit of FIG. 1 and the gasket of FIG. 26 shown in an assembled but pre-tightened state.

In a first embodiment, using the gasket 420, the first seal surface 66 of the port 28 is modified to have concentric annular axial projections 265 and 267, as seen in FIG. 28. The radially inner annular projection 265 comprises an annular ring of triangular cross-section extending from the first seal surface 66, disposed coaxially with the axis 29 of the port 28, at a diameter slightly greater than the inner diameter of the gasket 420. The height of the inner annular projection 265 is approximately equal to the thickness of the gasket 420. The radially outer annular projection 267 is similar to the inner annular projection 265 but is provided at a radial point along the first seal surface 66 which is between the inner annular projection 265 and the outer diameter of the gasket 420.

In the pre-tightened state shown in FIG. 28, the gasket 420 will be in contact with the peak of at least one of the inner and outer annular projections 265 and 267 on the first face surface 422 of the gasket 420, and in contact with the raised imperfections 134 on the second face surface 424 of the gasket 420.

Figure 29:
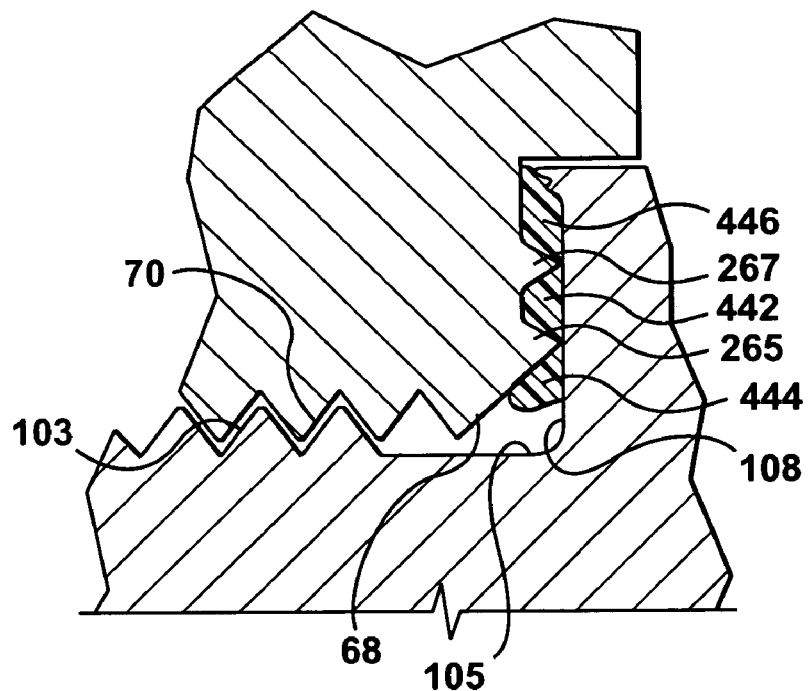
FIG. 29 is a cross-sectional view similar to FIG. 28 but showing parts in the tightened state.

Upon tightening the joint as shown in FIG. 29, the peaks of the inner and outer annular projections 265 and 267 pierce the gasket 420 and eventually come into metal-to-metal contact with the second seal surface 108. Some deformation of the peaks of the annular projections 265 and 267 may occur. Any such deformation contributes to the sealing effect of the joint, and the metal-to-metal contact reduces susceptibility to undesired loosening. In addition, a central annular portion 442 of the gasket 420 is captured between facing sides of the annular projections 265 and 267, the first seal surface 66, and the second seal surface 108. This elastomeric material is surrounded on all sides and fills the space. Thus, even though the portion 442 of the elastomeric material is in compression it cannot creep as it is confined by the metal-to-metal contact. The radially outer portion 446 of the gasket 420 acts as a further seal.

The radially inner portion 444 of the gasket 420 is at least partially confined by the thread lead surface 68, the undercut portion 105, and the second seal surface 108. Thread lead 68 and the undercut portion 105 are sized to provide a cavity sufficient to accommodate the volume of the radially inner portion 444 of the gasket 420. However, some clearance is required between the mating male threads 103 and the female threads 70, and as a result some creep may occur. For this reason, the radially inner portion 444 of gasket 420 may serve as a further seal but is not relied upon.

In another embodiment of the present invention employing the elastomeric gasket 420, a single annular projection 369 is provided on a modified seal surface 66. Referring to FIG. 30, the annular projection 369 has a triangular cross-section, with a height approximately equal to the thickness of the gasket 420. The annular projection 369 is disposed coaxially with the axis 29 of the port 28, at a radial position near the midpoint of the inner and outer diameters of the first seal surface 66.

In the pre-tightened state (FIG. 30), the first face surface 422 of the gasket 420 is in contact with the peak of the annular projection 369, and the second face surface 424 of the gasket 420 is in contact with the raised imperfections 134.

Figure 31:
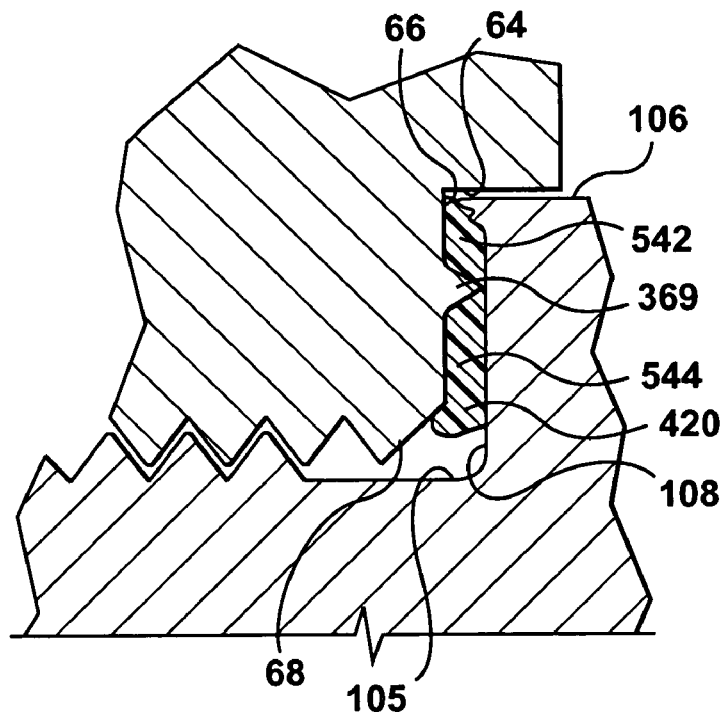
FIG. 31 is a cross-sectional view of the parts of FIG. 30 but showing the parts in the tightened state.
Figure 32:
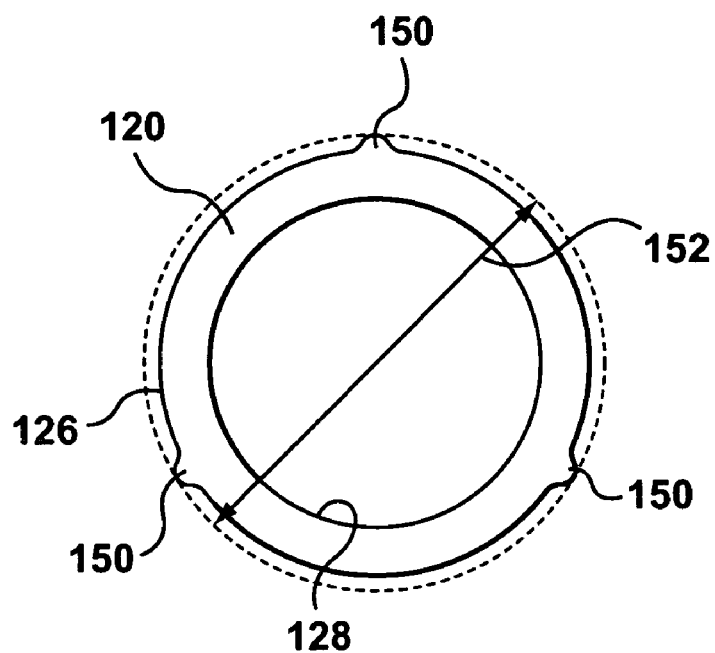
FIG. 32 is a front view of the gasket of FIG. 19 showing optional features.

Upon tightening the joint (FIG. 31), the peak of the annular projection 369 pierces the gasket 420, and eventually comes into metal to metal contact with the second seal surface 108. This structure provides a seal and protects against loosening of the joint over time, as in the previous embodiment. Furthermore, the outer annular portion 542 of the gasket 420 is captured in a cavity bounded by the outer side face of the annular projection 369, the first seal surface 66, the second seal surface 108, and the close fit between the clearance wall 64 and the outer diameter of the second cylindrical portion 106. As discussed above, the portion 542 of the gasket 420 is confined on all sides, similarly to portion 442, and therefore cannot creep which provides a satisfactory seal. As with the previous embodiment, the torque available from hand operated tools is sufficient to pierce the gasket 420 and continue to move the connector 14 into the valve housing 20 until metal to metal contact occurs.

While preferred embodiments of the invention have been described herein in detail, it is to be understood that this description is by way of example only, and is not intended to be limiting. The full scope of the invention is to be determined from reference to the appended claims.

The invention claimed is:

1. A kit of parts for configuring and assembling a shut-off valve in the field, the kit of parts comprising:
   a) at least one valve body, a plurality of connection fittings, and a plurality of annular elastomeric gaskets;
   b) the at least one valve body including a housing having first, second, and third ports and a closure member disposed in the housing, the valve body defining internal flow oaths between the first and second, first and third, and second and third ports, respectively, each of said internal flow paths extending through the closure member, the closure member being movable between open and closed positions;
   c) each port having a first common configuration and a first seal surface;
   d) the connection fittings having first ends with a second common configuration including a second seal surface for assembly with the first common configuration of any one of the plurality of ports;
   e) each of the gaskets adapted to be inserted between the first seal surface and the second seal surface of a respective port and connection fitting for providing a leak-proof seal therebetween; and,
   f) the connection fittings having a variety of different adaptor ends disposed generally opposite the respective first ends for attachment to any of a variety of field-encountered conduit configurations; and
   g) wherein the at least one valve body further comprises a plurality of valve closure member sealing structures to provide leak-proof operation of said valve closure member when in and moving between said open and closed positions, said plurality of valve closure member sealing structures adapted to operably seal said closure member independently of said connection fittings received in said ports, and
   wherein at least one of said plurality of sealing structures comprises an annular seal disposed adjacent the closure member, and a retaining element fixed in a respective port to retain said annular seal adjacent the closure member, said retaining element comprising a sleeve having an annular outer contact surface which engages said inner surface of said respective port in sealing press-fit engagement, and wherein said retaining element comprises a plurality of radially outwardly extending annular ribs, at least a portion of said outer contact surface of said sleeve being provided adjacent the outer diameter of at least one of said plurality of annular ribs.

2. The kit of parts of claim 1 wherein said inner surface of said respective port has an annular groove and one of said plurality of annular ribs is adapted to seat within said annular groove.

3. A valve body according to claim 1 wherein said sealing structure further comprises an o-ring disposed adjacent at least one of said annular ribs of said sleeve.

4. A valve body according to claim 1 wherein said sleeve has an axially inner end adjacent said annular seal, an axially outer end opposite said axially inner end, and first and second annular ribs, said first annular rib disposed between said axially inner end of said sleeve and said second annular rib.

5. A valve body according to claim 4 wherein said first annular rib has an outer diameter less than an outer diameter of said second annular rib.

6. A valve body according to claim 4 wherein said sleeve has an axially outermost annular rib disposed adjacent said axially outer end of said sleeve, and a generally cylindrical extension portion extending between said axially outermost annular rib and said axially outer end of said sleeve.

7. A kit of parts for configuring and assembling a shut-off valve in the field, the kit of parts comprising:
   a) at least one valve body, the valve body having an interior with a closure member disposed therein, the closure member movable between positions for controlling fluid flow through the valve body, the valve body including a number of ports each having inner ends adjacent the closure member and outer ends directed away from the closure member, wherein each one of the ports is in fluid communication with the interior and each one of the ports has a first common configuration including a first seal surface;
   b) a plurality of connection fittings, each connection fitting having a first end with a second common configuration engageable with the first common configuration of any one of the ports for connection therewith, the second common configuration including a second seal surface, each one of the connection fittings having an adaptor end generally opposite the first end, the adaptor ends of the plurality of connection fittings being non-uniform to provide a variety of adaptor configurations for attachment to any of a variety of field-encountered conduit configurations to which the valve body is to be connected; and,
   c) a plurality of annular elastomeric gaskets, each one of the gaskets positionable between the first seal surface and the second seal surface of a respective port and connection fitting for providing a leak-proof seal therebetween, and
   wherein at least one of the first and second seal surfaces comprises at least one projection adapted to pierce a respective one of the elastomeric gaskets and abut the other one of the first and second seal surfaces upon assembly of said respective port and connection fitting at relatively low, hand-tool torque levels.

8. The kit of parts of claim 7, wherein the at least one projection comprises a first annular projection with a generally sharp leading edge.

9. The kit of parts of claim 8, wherein the first and second seal surfaces are configured to interact upon assembly of said respective port and connection fitting to provide an enclosed annular cavity that traps and is filled with at least a portion of said elastomeric gasket.

10. The kit of parts of claim 9, wherein the first annular projection defines one boundary surface of the enclosed annular cavity.

11. The kit of parts of claim 10 wherein the at least one projection comprises a second concentric annular projection, each of the first and second annular projections having a respective generally sharp leading edge, and wherein each one of the gaskets has a common radial extent generally defined by inner and outer gasket diameters, the respective leading edges of the two annular projections having respective edge diameters, each respective edge diameter being intermediate the inner and outer gasket diameters.

12. A kit of parts for configuring and assembling a shut-off valve in the field, the kit of parts comprising:
   a) at least one valve body, the at least one valve body including a housing having a total of three fluid conductable ports including a first, a second, and a third port, and a closure member disposed in the housing, the closure member being movable between open and closed positions, the valve body defining three internal flow paths between the first and second, first and third, and second and third ports, respectively, each of said three internal flow paths extending through the closure member when the closure member is in the open position, each of said three internal flow paths being blocked when the closure member is in the closed position, and each one of the ports having a first common configuration including a first seal surface;
   b) a plurality of connection fittings, each connection fitting having a first end with a second common configuration engageable with the first common configuration of any one of the three ports for connection therewith, the second common configuration including a second seal surface, each one of the connection fittings having an adaptor end generally opposite the first end, the adaptor ends of the plurality of connection fittings being non-uniform to provide a variety of adaptor configurations for attachment to any of a variety of field-encountered conduit configurations to which the valve body is to be connected; and
   c) a plurality of annular gaskets, each one of the gaskets positionable between the first seal surface and the second seal surface of a respective port and connection fitting for providing a leak-proof seal therebetween.

13. The kit of parts of claim 12 wherein the at least one valve body comprises a plurality of valve closure member sealing structures each including an annular seal bearing against an outer surface of the closure member, the sealing structures providing leak-proof operation of said valve closure member when in and moving between said open and closed positions, each said annular seal bearing against the outer surface of the closure member independently of said connection fittings received in said ports.

* * * * *